US011507011B2

(12) United States Patent
Belarmino et al.

(10) Patent No.: US 11,507,011 B2
(45) Date of Patent: Nov. 22, 2022

(54) PARTIAL REVERSE CLUTCH ASSEMBLY

(71) Applicant: LEXMARK INTERNATIONAL, INC., Lexington, KY (US)

(72) Inventors: Genri Solano Belarmino, Cebu (PH); Darren Adam Keese, Lexington, KY (US); Daniel Lee Thomas, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 10 days.

(21) Appl. No.: 17/223,201

(22) Filed: Apr. 6, 2021

(65) Prior Publication Data

US 2021/0356002 A1    Nov. 18, 2021

Related U.S. Application Data

(60) Provisional application No. 63/009,250, filed on Apr. 13, 2020.

(51) Int. Cl.
*G03G 15/00* (2006.01)
*F16D 41/22* (2006.01)
*F16H 3/60* (2006.01)

(52) U.S. Cl.
CPC ........... *G03G 15/757* (2013.01); *F16D 41/22* (2013.01); *F16H 3/60* (2013.01)

(58) Field of Classification Search
CPC .... F16D 41/00–22; G03G 15/757; F16H 3/60
See application file for complete search history.

(56) References Cited

U.S. PATENT DOCUMENTS

| 5,624,196 | A  | * | 4/1997  | Jackson  | B65H 29/00 400/625 |
| 6,170,348 | B1 | * | 1/2001  | Faucher  | B65H 3/0669 74/354 |
| 8,231,288 | B2 | * | 7/2012  | Kawamura | B41J 13/0018 400/636 |
| 8,240,449 | B2 | * | 8/2012  | Shinagawa | F16D 41/22 188/134 |
| 2009/0277744 | A1 | * | 11/2009 | Shinagawa | F16D 11/14 192/41 S |
| 2009/0279933 | A1 | * | 11/2009 | Kawamura | B41J 13/0018 475/12 |
| 2021/0317897 | A1 | * | 10/2021 | Belarmino | F16H 3/10 |

* cited by examiner

*Primary Examiner* — David R Morris

(57) ABSTRACT

A partial reverse clutch assembly comprises a frame, a coupling member, a corrugated swing body, and a cam body. The frame mounts an input gear and an output gear, and, a coupling member that is disposed between input and output gears couple the input gear to the output gear to transmit a motorized rotational drive in a first direction. The swing body is coupled between the input gear and the coupling member and comprises a projecting swing arm. The cam body abuts and defines a sliding contact between the swing body and the coupling member, where a reversal of the motorized rotational drive oppositely rotates the output gear in engagement with the swing arm in a second direction. The cam body is displaced upon contact with the swing body during the rotation in the second direction to decouple the coupling member between the input gear and the output gear.

22 Claims, 25 Drawing Sheets

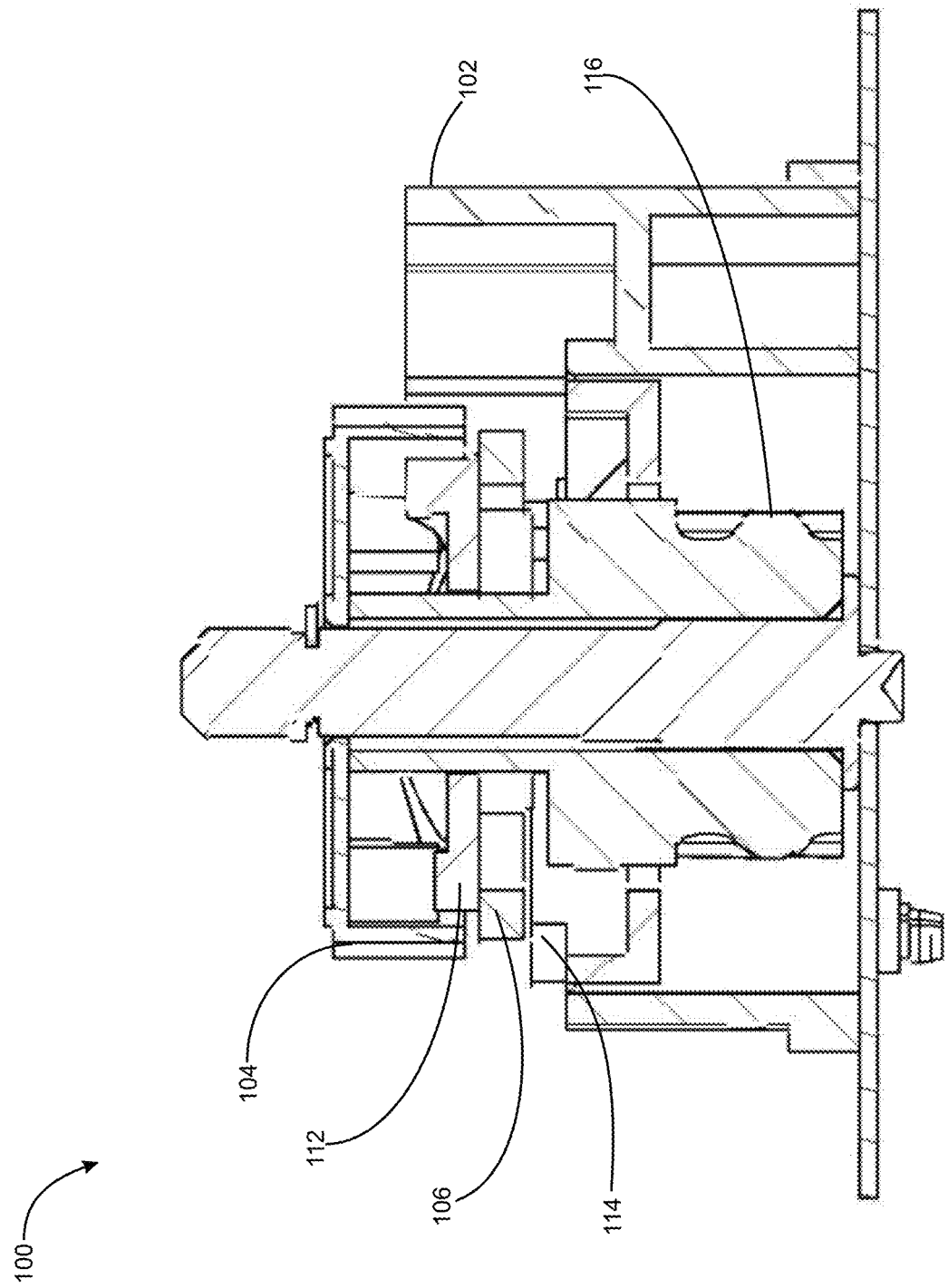

PARTIAL REVERSE CLUTCH ASSEMBLY

CROSS REFERENCES TO RELATED APPLICATIONS

This application claims priority and benefit under 35 U.S.C. 119(e) from U.S. provisional application No. 63/009,250 titled "A Partial Reverse Clutch Assembly," having a filing date of Apr. 13, 2020.

BACKGROUND

1. Field of the Disclosure

The present disclosure relates generally to simultaneous operations in a printer that includes reversal of a photoconductor drum and a reversed duplex actuation of media using a clutch assembly and more particularly to a partial reverse clutch assembly.

2. Description of the Related Art

In current mono platforms, at the end of the printing cycle, the motor driving the photoconductor drum is reversed. This motor reversal allows the sharp edge of the elastic urethane cleaner blade to relax, which helps with localized fatiguing of the material. The motor reversal also allows the toner/EPAs to be backed out, which helps prevent accumulation that can cause localized cleaning failures. This helps photoconductor units reach their intended life. The reversal of the photoconductor drum is, for example, in the range of 15 to 18 degrees of motion. More motion than this may lead to undesirable outcomes, such as, toner contamination of the charge rolls.

In the current mid-range mono platforms, there is a single motor dedicated to the entire operation of the printer. In order to reverse the photoconductor drum, the main motor of the machine is reversed. This means that the reverse motion of the motor is entirely dedicated to the photoconductor reversal function. When considering duplex media present in the mid-range platform, it is necessary to reverse the motion of the media to send it back into the machine to be imaged again. Currently, this reversed motion is accomplished via a solenoid which is activated and moved along a swing arm in the gear train that changes the direction of a paper nip. Thus, there is a need to allow the mid-range mono platform to use the reversal of the main motor to reverse the paper for the duplex operation while simultaneously preserving the reversing of the photoconductor drum a precise amount. Hence, an expensive solenoid is removed from the printer platform to save additional costs significantly.

SUMMARY

A partial reverse clutch assembly disclosed here addresses the above mentioned need to allow the mid-range mono platform to use the reversal of the main motor to reverse the paper for the duplex operation while simultaneously preserving the reversing of the photoconductor drum by a precise amount. The partial reverse clutch assembly comprises a frame, a coupling member, a corrugated swing body, and a cam body. The frame is configured to mount an input gear and an output gear, and the coupling member is disposed between the input gear and the output gear, wherein the coupling member couples the input gear to the output gear to transmit a motorized rotational drive in a first direction. The corrugated swing body is coupled between the input gear and the coupling member, and comprises a projecting swing arm. The cam body abuts and defines a sliding contact between the corrugated swing body and the coupling member, wherein a reversal of the motorized rotational drive oppositely rotates the output gear in engagement with the swing arm in a second direction. The cam body is displaced upon contact with the corrugated swing body during the rotation in the second direction, or the reverse direction, to decouple the coupling member between the input gear and the output gear.

In some embodiments, the frame mounts the input gear on a lower arm and mounts the output gear on an upper arm, and wherein the input gear and the output gear are axially aligned to each other. In some embodiments, the coupling member is cylindrical in form and axially aligned with respect to the input gear and the output gear. In some embodiments, the output gear in engagement with the swing arm rotates in the second direction at a predetermined angle of rotation that is based on at least two stopper portions positioned on the frame that intercept the reverse rotation of the swing arm. In some embodiments, the partial reverse clutch assembly further comprises a ring gear and a planet gear, wherein the ring gear is positioned on the frame and the planet gear is distally positioned on the swing arm, and wherein the engagement between the ring gear and the planet gear generates a force on the swing arm to push the corrugated swing body against the cam body to push, for example, lift or lower, the cam body.

In some embodiments, a variation in the gear ratios between the ring gear and the planet gear determines the angle of reverse rotation of the output gear before the decoupling of the coupling member between the input gear and the output gear. In some embodiments, a variation in an inclination of cam portions on the cam body determines the angle of reverse rotation of the output gear before the decoupling of the coupling member between the input gear and the output gear. In some embodiments, a variation in the positioning of the at least two stopper portions determine the angle of reverse rotation of the output gear before the decoupling of the coupling member between the input gear and the output gear. In some embodiments, the decoupling of the coupling member between the input gear and the output gear freely rotates the input gear until the motorized rotational drive is reinstated in the first direction of rotation. In some embodiments, the reversal of the motorized rotational drive is configured to reverse a printing path of a printable media that is driven by the motorized rotational drive for a duplex operation of a printer. In some embodiments, the reversal of the motorized rotational drive simultaneously partially rotates a photoconductor drum gear that is in geared engagement with the output gear due to partial rotation of the output gear in the second direction.

BRIEF DESCRIPTION OF THE DRAWINGS

The accompanying drawings incorporated in and forming a part of the specification, illustrate several aspects of the present disclosure, and together with the description serve to explain the principles of the present disclosure.

FIG. 4C is a sectional view of the partial reverse clutch assembly along the section B-B shown in FIG. 3B, when the coupling member is disengaged, according to the first embodiment.

DETAILED DESCRIPTION

In the following description, reference is made to the accompanying drawings where like numerals represent like elements. The embodiments are described in sufficient detail to enable those skilled in the art to practice the present disclosure. It is to be understood that other embodiments may be utilized and that process, electrical, and mechanical changes, etc., may be made without departing from the scope of the present disclosure. Examples merely typify possible variations. Portions and features of some embodiments may be included in or substituted for those of others. The following description, therefore, is not to be taken in a limiting sense and the scope of the present disclosure is defined only by the appended claims and their equivalents.

Also, it is to be understood that the phraseology and terminology used herein is for the purpose of description and should not be regarded as limiting. The use herein of "including," "comprising," or "having" and variations thereof is meant to encompass the items listed thereafter and equivalents thereof as well as additional items. Further, the terms "a" and "an" herein do not denote a limitation of quantity but rather denote the presence of at least one of the referenced item.

Figure 1:
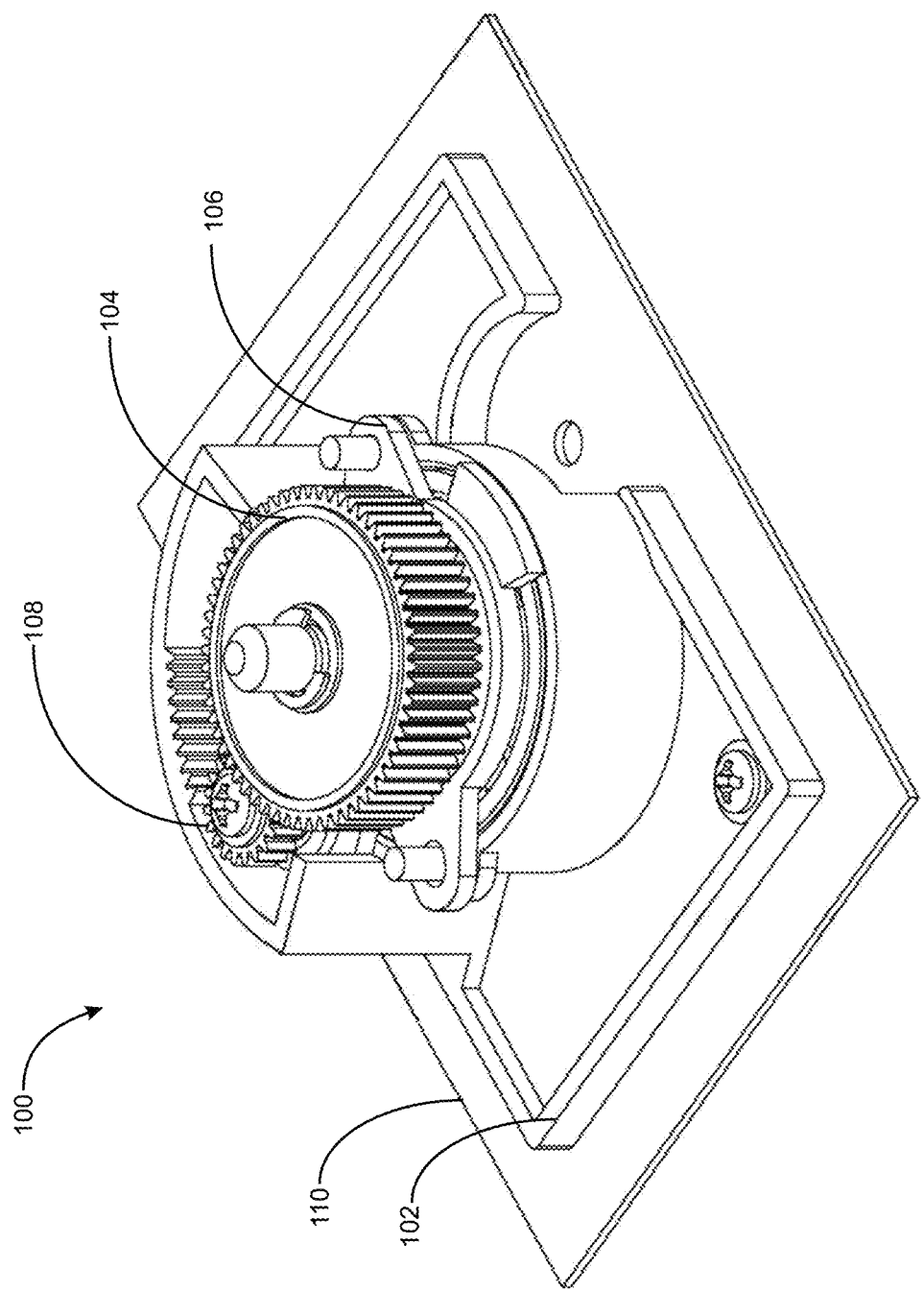
FIG. 1 is an isometric view of the partial reverse clutch assembly, as a first embodiment.

FIG. 1 is an isometric view of the partial reverse clutch assembly 100, as a first embodiment. The main components in this isometric view of the partial reverse clutch assembly 100 include the frame 102 or the housing, the input gear 104 housed in the frame 102, a cam body 106 or a translator positioned below the input gear 104, a planet gear 108 in engagement with the input gear 104 and the frame 102, and a gear plate 110 that mounts the frame 102. The positioning and functionality of other associated components of the partial reverse clutch assembly 100 are clearly described in the exploded view shown in FIG. 2.

Figure 2:
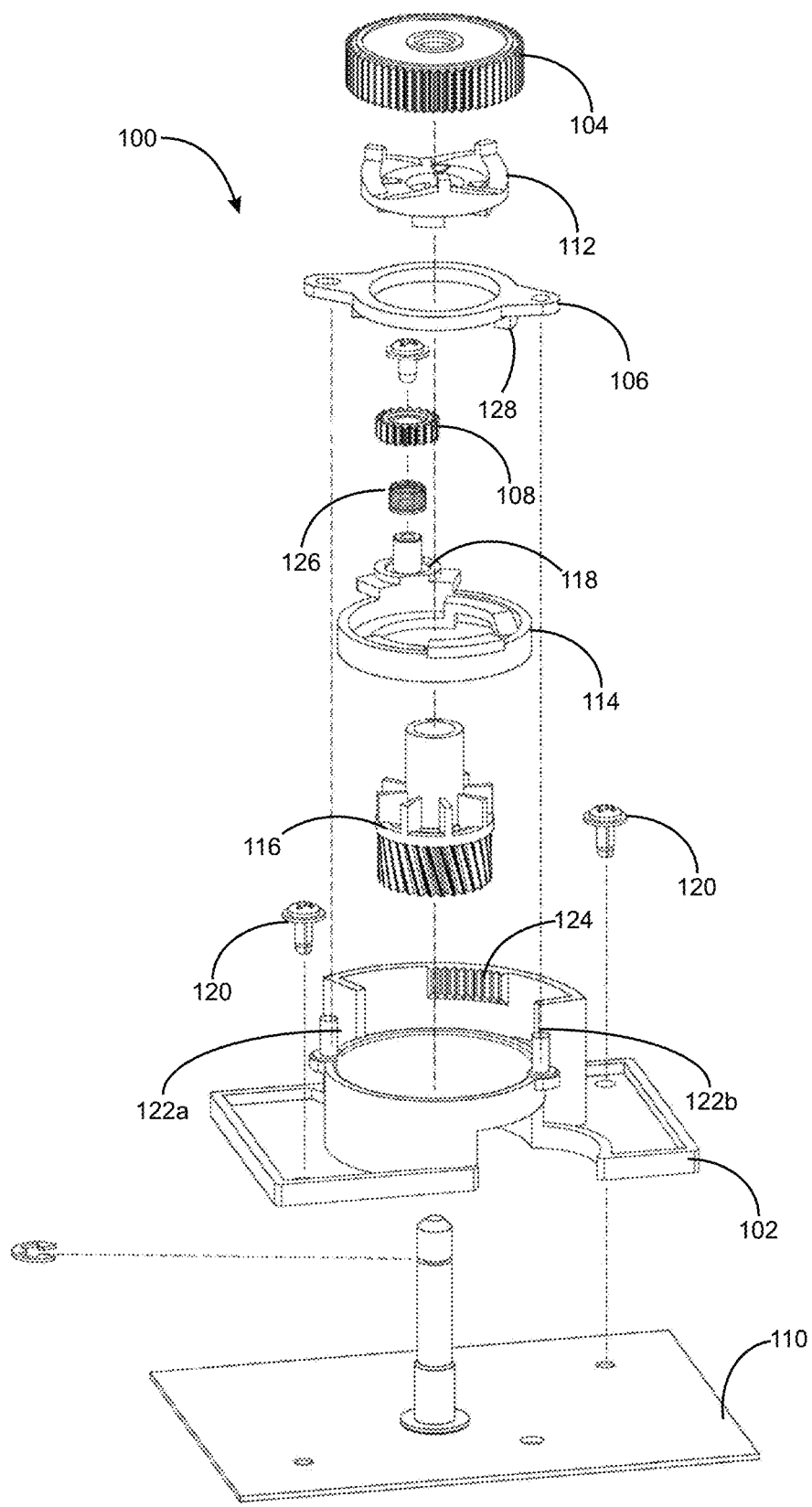
FIG. 2 is an exploded view of the partial reverse clutch assembly shown in FIG. 1, as the first embodiment.

FIG. 2 is an exploded view of the partial reverse clutch assembly 100 shown in FIG. 1, as the first embodiment. As described before and in addition to FIG. 1, the partial reverse clutch assembly 100 comprises the frame 102, a coupling member 112 or a coupler, a corrugated swing body 114 or a rotator, and a cam body 106 or the translator. The gear plate 110 fixedly positions the frame 102 using screws 120. The frame 102 is configured to mount an input gear 104 and an output gear 116, and the coupling member 112 is disposed between the input gear 104 and the output gear 116. The coupling member 112 couples the input gear 104 to the output gear 116 to transmit a motorized rotational drive in a first direction. The swing body 114 is coupled between the input gear 104 and the coupling member 112, and comprises a projecting swing arm 118.

The cam body 106 abuts and defines a sliding contact between the swing body 114 and the coupling member 112, wherein a reversal of the motorized rotational drive oppositely rotates the output gear 116 in engagement with the swing arm 118 in a second direction, or a reverse direction. The cam body 106 is displaced, or lifted, upon contact with the swing body 114 during the rotation in the second direction to decouple the coupling member 112 from between the input gear 104 and the output gear 116. In some embodiments, the output gear 116 in engagement with the swing arm 118 rotates in the second direction at a predetermined angle of rotation that is based on at least two stopper portions 122a and 122b positioned on the frame 102 that intercept the reverse rotation of the swing arm 118.

In some embodiments, the partial reverse clutch assembly 100 further comprises a ring gear 124 and the planet gear 108, wherein the ring gear 124 is positioned on the frame 102 and the planet gear 108 is distally positioned on the swing arm 118. The engagement between the ring gear 124 and the planet gear 108 generates a force on the swing arm 118 to push the swing body 114 against the cam body 106 to lift the cam body 106, thereby disengaging the input gear 104 and the output gear 116 during the reverse rotation in second direction. In another embodiment, a friction spring 126 is positioned between the swing arm 118 and the planet gear 108 to further lift the cam body 106 when the swing arm 118 that is mounted with the planet gear 108 rotates along the ring gear 124 and pushes the swing body 114 against the cam body 106 during the rotation in the reverse or second direction.

In some embodiments, a variation in the gear ratio between the ring gear 124 and the planet gear 108 determines the angle of reverse rotation of the output gear 116 before the decoupling of the coupling member 112 between the input gear 104 and the output gear 116. A variation in an inclination of cam portions 128 on the cam body 106 determines the angle of reverse rotation of the output gear 116 before the decoupling of the coupling member 112 between the input gear 104 and the output gear 116. In another embodiment, a variation in the positioning of the two stopper portions 122a and 122b determine the angle of reverse rotation of the output gear 116 before the decoupling of the coupling member 112 between the input gear 104 and the output gear 116.

The decoupling of the coupling member 112 between the input gear 104 and the output gear 116 freely rotates the input gear 104 until the motorized rotational drive is reinstated in the first direction of rotation. Hence, the reversal of the motorized rotational drive is configured to reverse a printing path of a printable media that is driven by the motorized rotational drive for a duplex operation of a printer. In some embodiments, the reversal of the motorized rotational drive simultaneously partially rotates a photoconductor drum gear that is in geared engagement with the output gear 116 due to partial rotation of the output gear 116 in the second direction, or reverse direction.

Figure 3A:
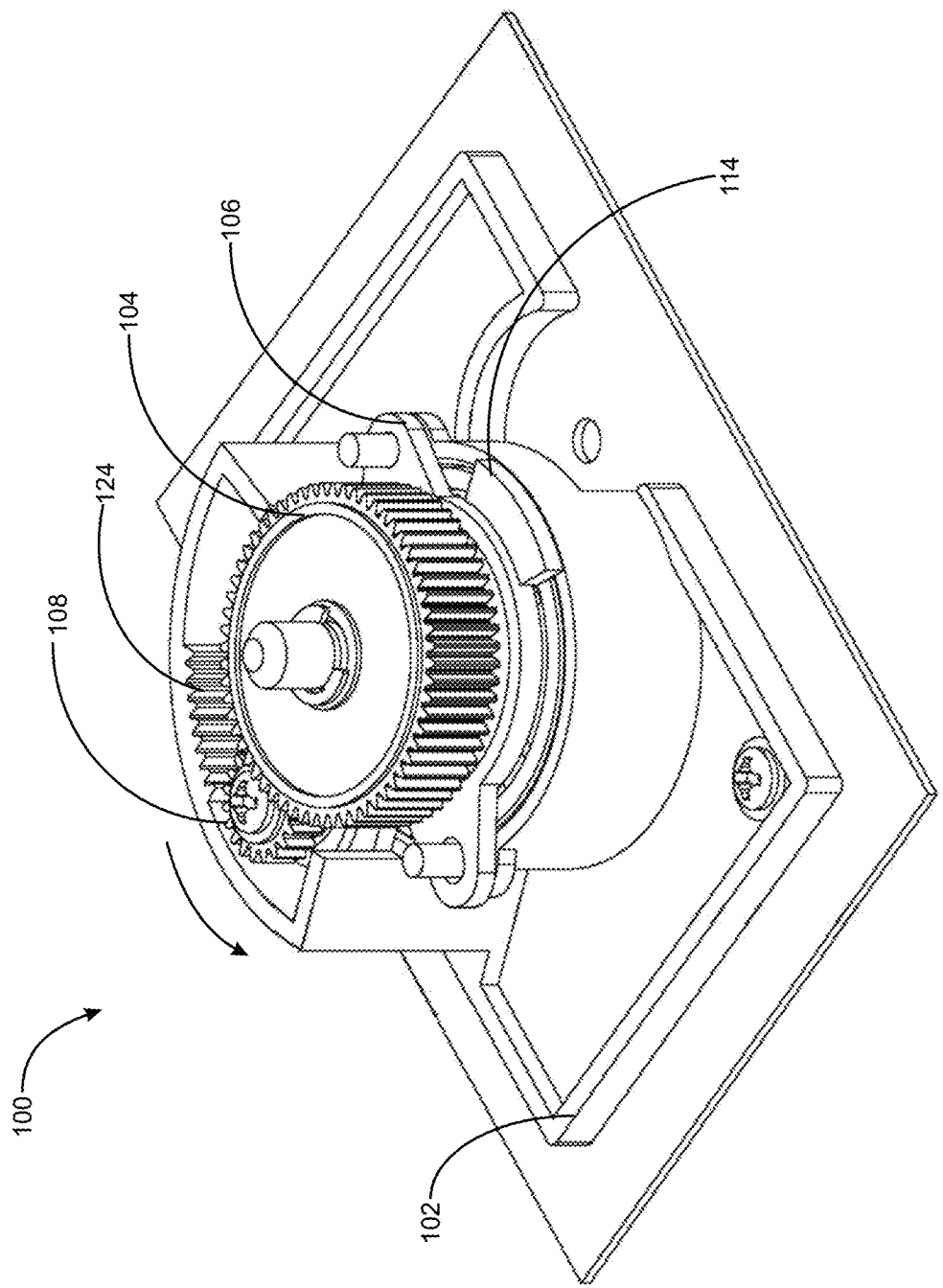
FIG. 3A is an isometric view of the partial reverse clutch assembly when the coupling member is engaged, according to the first embodiment.
Figure 3B:
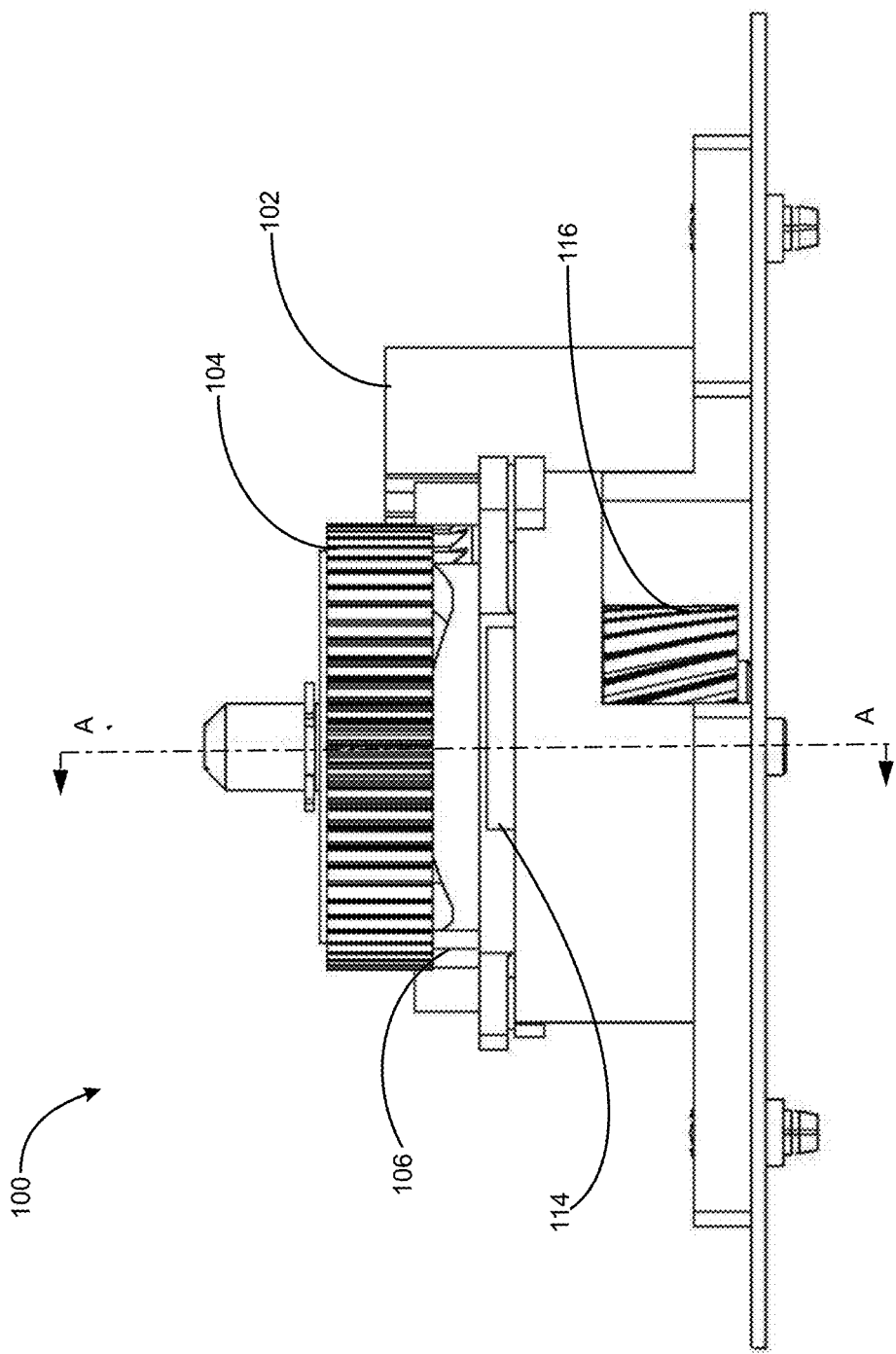
FIG. 3B is a side perspective view of the partial reverse clutch assembly when the coupling member is engaged, according to the first embodiment.
Figure 3C:
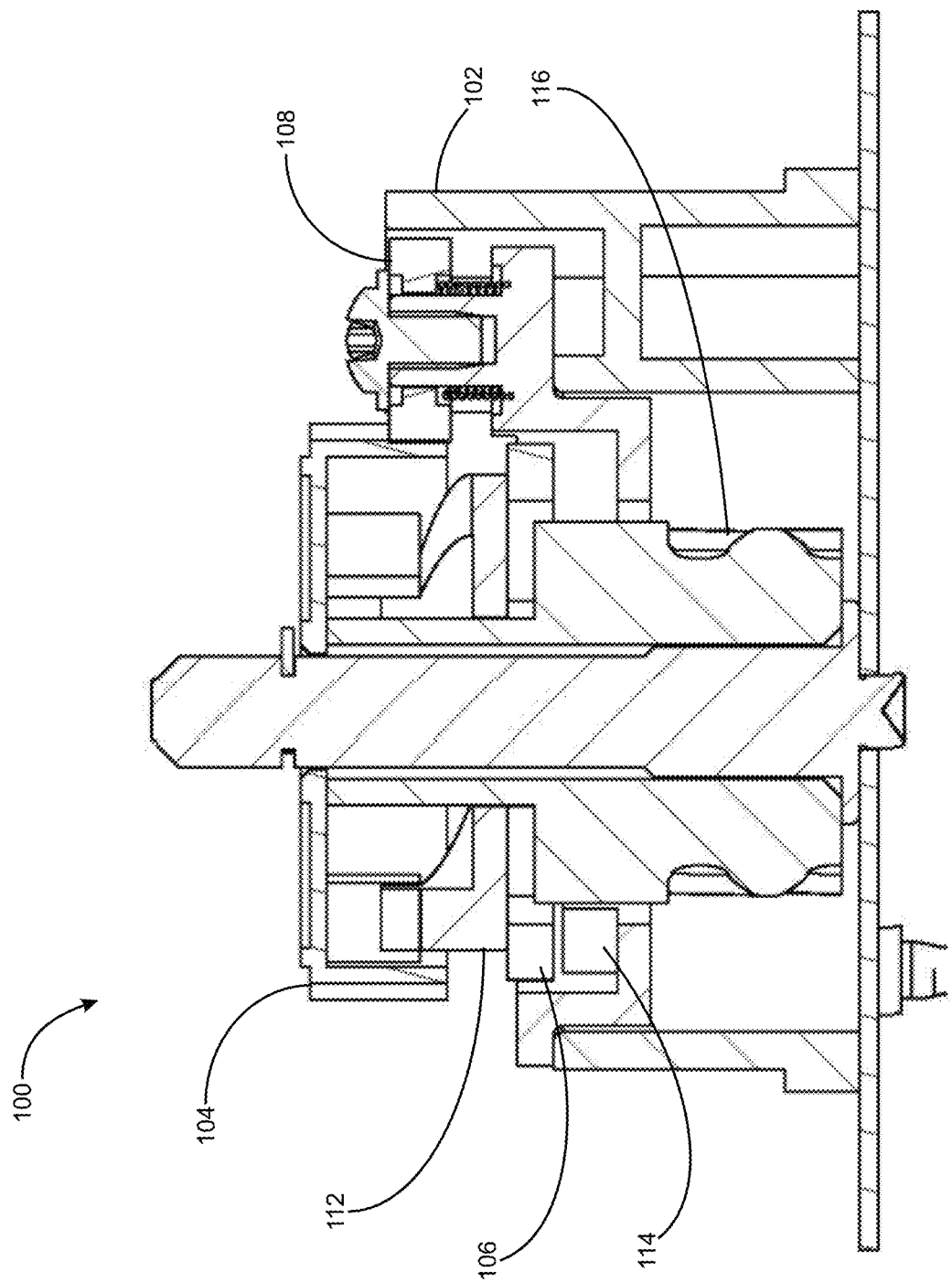
FIG. 3C is a sectional view of the partial reverse clutch assembly along the section A-A shown in FIG. 3B, when the coupling member is engaged, according to the first embodiment.

FIGS. 3A-3C illustrate an isometric view, a side perspective view, and a sectional view of the partial reverse clutch assembly 100 when the coupling member 112 is engaged, according to the first embodiment. As described above, the frame 102 mounts the input gear 104 and the output gear 116, where the coupling member 112 is disposed between the input gear 104 and the output gear 116. The coupling member 112 couples the input gear 104 to the output gear 116 to transmit a motorized rotational drive in a first direction, or the forward direction. The coupling member 112 is configured to engage the input gear 104 and the output gear 116 continually during a forward rotation of the input gear 104 from the motorized rotational drive, so that the output gear 116 is continuously rotated throughout the forward rotation of the input gear 104. As shown in FIG. 3A, the planet gear 108 rotates from one end of the engagement portion of the ring gear 124 and rests at the other end of the engagement portion, to allow the continuous engagement of the input gear 104 and the output gear 116 during the forward rotation in first direction.

Figure 4A:
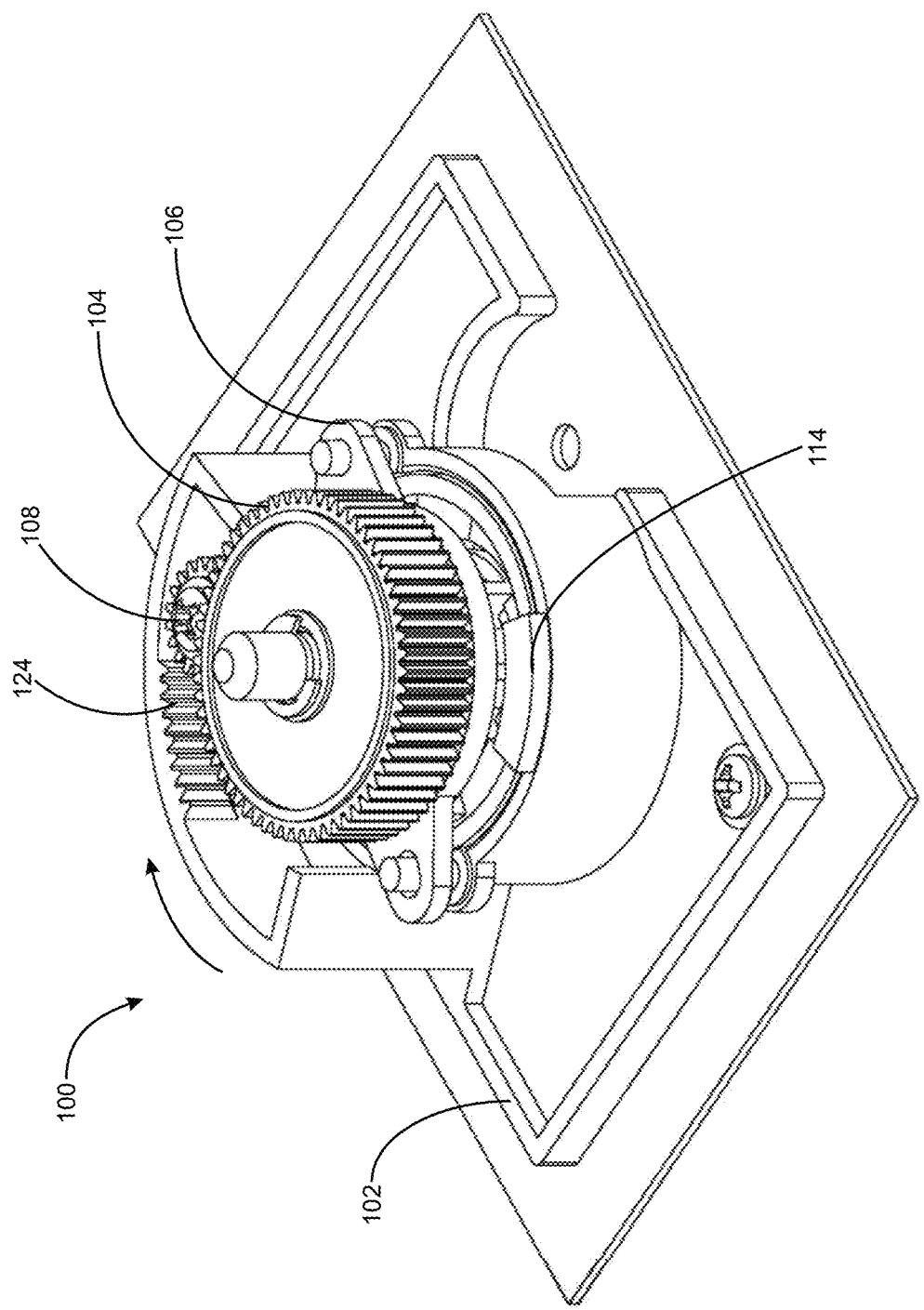
FIG. 4A is an isometric view of the partial reverse clutch assembly when the coupling member is disengaged, according to the first embodiment.
Figure 4B:
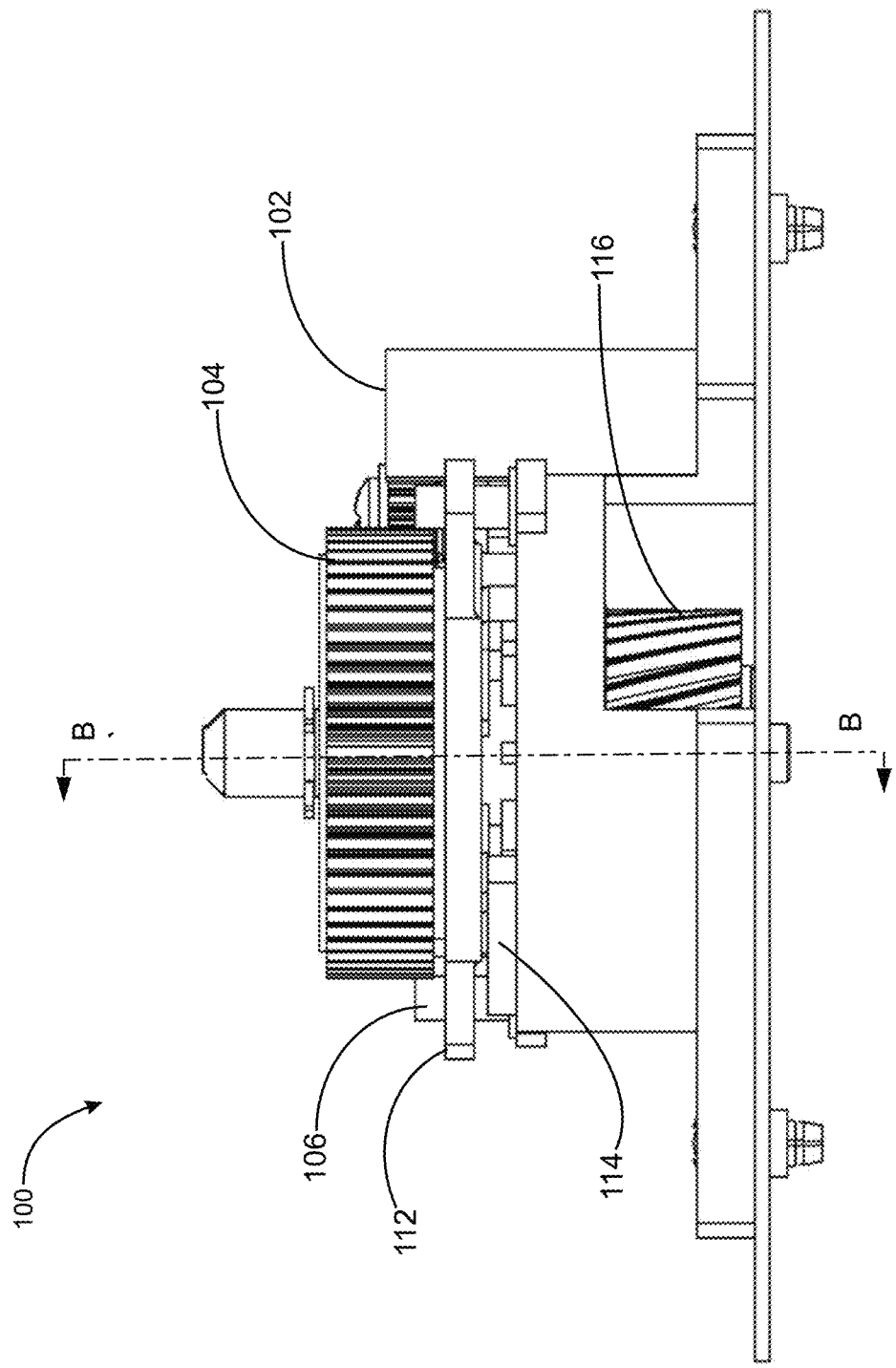
FIG. 4B is a side perspective view of the partial reverse clutch assembly when the coupling member is disengaged, according to the first embodiment.

FIGS. 4A-4C show an isometric view, a side perspective view, and a sectional view respectively of the partial reverse clutch assembly 100, when the coupling member 112 is disengaged, according to the first embodiment. As described in FIG. 2, the corrugated swing body 114 is operatively positioned between the input gear 104 and the coupling member 112, and the swing body 114 comprises a projecting swing arm 118, as shown in FIG. 2. As shown in FIGS. 4A-4C, the cam body 106 defines a sliding contact between the swing body 114 and the coupling member 112. When the motorized rotational drive is reversed, the output gear 116 is rotated in an opposite direction in engagement with the swing arm 118 in a second direction, or the reverse direction, with respect to the forward direction shown in FIG. 3A. During the rotation in the reverse direction, the cam body 106 is lifted when in contact with the swing body 114 to separate the coupling member 112 from between the input gear 104 and the output gear 116.

Figure 5:
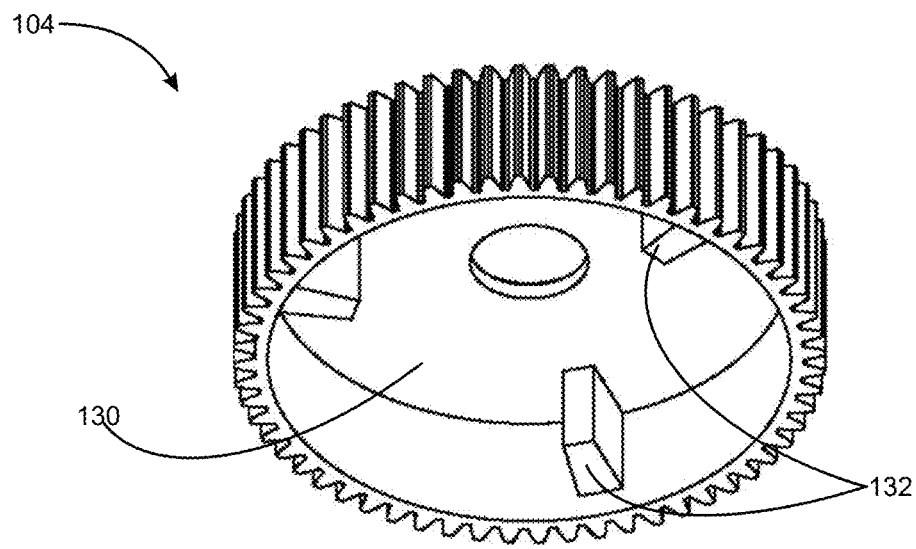
FIG. 5 is a bottom perspective view of the input gear of the partial reverse clutch assembly, according to the first embodiment.
Figure 6:
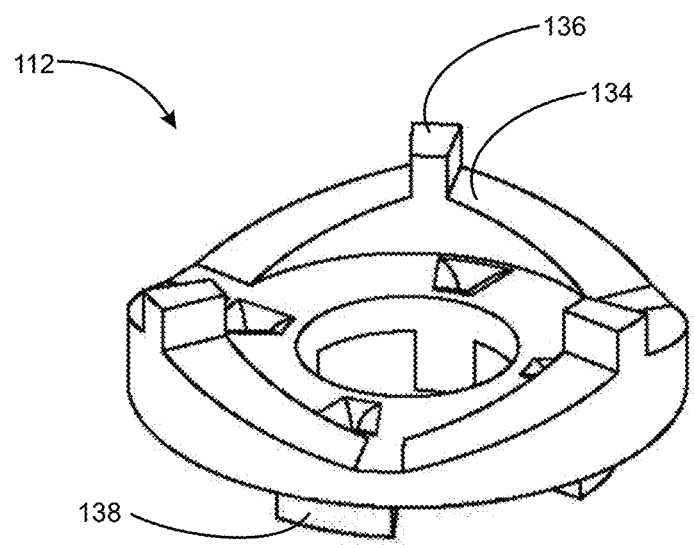
FIG. 6 is a top perspective view of the frame of the partial reverse clutch assembly, according to the first embodiment.

FIG. 5 is a bottom perspective view of the input gear 104 of the partial reverse clutch assembly 100, according to the first embodiment. The input gear 104 is defined an annular cavity 130 that is designed to position a set of tabs 132. The tabs 132 that are positioned on the underside of input gear 104 pushes the coupling member 112 along the cam members or slopped to cams 138 of the coupling member 112, as shown in FIG. 6. This push from the tabs 132 engages the coupling member 112 with the output gear 116 when the swing body 114 (or rotator) is in position to allow the cam body 106 (or translator) to move towards the output gear 116. This manner of engagement of the coupling member 112 with the output gear 116 also transfers torque to the coupling member 112.

FIG. 6 is a top perspective view of the coupling member 112 of the partial reverse clutch assembly 100, according to the first embodiment. The coupling member 112 is generally circular in form and positions a set of sloped cams 134 along the circumference of the coupling member 112. The sloped cams 134 on the top of the coupling member 112 push the coupling member 112 towards the output gear 116 when the torque is applied. The tabs 136 at the top of each sloped cam 134 receives the torque transfer from the input gear 104. The tabs 138 at the bottom of the coupling member 112 transfer torque to the output gear 116 during engagement with the output gear 116.

Figure 7:
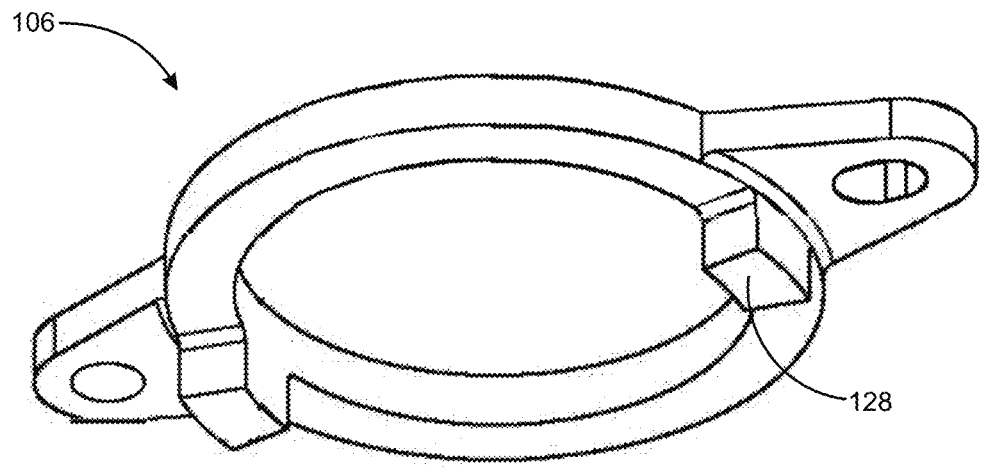
FIG. 7 is a bottom perspective view of the cam body or the translator of the partial reverse clutch assembly, according to the first embodiment.

FIG. 7 is a bottom perspective view of the cam body 106 or the translator of the partial reverse clutch assembly 100, according to the first embodiment. The cam body 106 is positioned or trapped between the coupling member 112 and the swing body 114, and is therefore rotationally locked by pins positioned on the frame 102, so the cams 140 on the swing body 114 pushes the cam body 106 in an upward direction or allow the cam body 106 to traverse in a downward direction. The coupling member 112 always has a downward thrust when the input gear 104 is turning, so the coupling member 112 always follows the vertical motion of the cam body 106. The surfaces that are pushed by the swing body 114 are raised so that the surfaces are nested into the swing body 114 when the swing body 114 is in a downward or engagement position.

Figure 8:
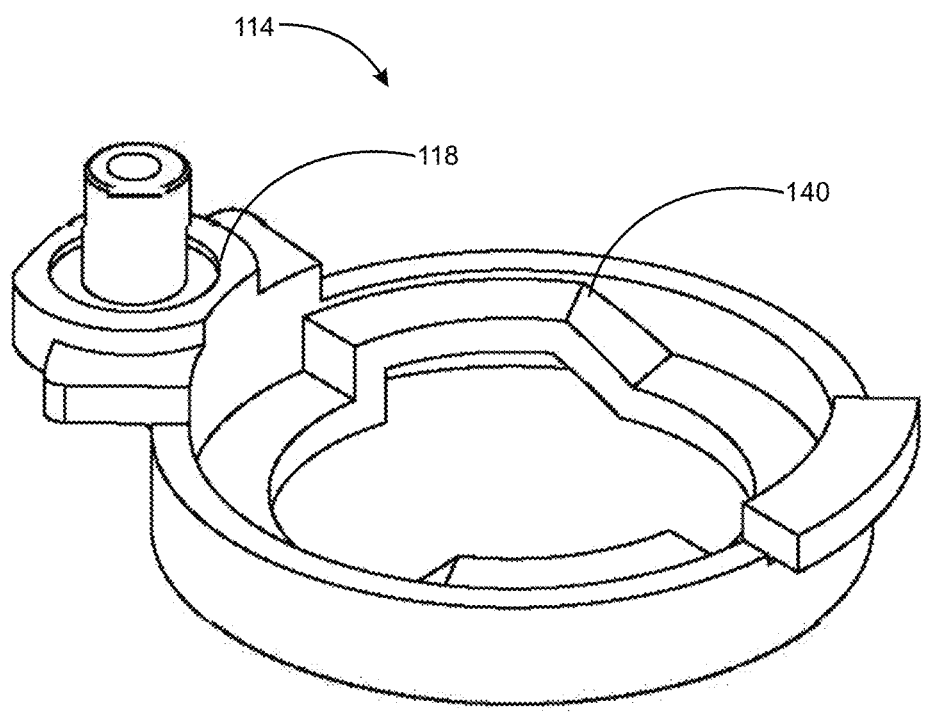
FIG. 8 is a top perspective view of the corrugated swing body or the rotator of the partial reverse clutch assembly, according to the first embodiment.

FIG. 8 is a top perspective view of the corrugated swing body 114 or the rotator of the partial reverse clutch assembly 100, according to the first embodiment. The swing body 114 that also comprises the sing arm 118, has a narrow range of motion that determines how far the system of engagement between the input gear 104, the coupling member 112, and the output gear 116, rotates in reverse before disengaging the output gear 116. This rotation is facilitated using the movement of the planet gear 108. When the input gear 104 switches directions, the planet gear 108 is pulled with the input gear 104 due to its resistance to spinning from the friction spring 126. This pulls the planet gear 108 into the rack or the ring gear 124 on the frame 102 that subsequently forces the planet gear 108 to continue rotating with the input gear 104, even when the planet gear 108 meets resistance from the cams 140 of the swing body 114 that push the cam body 106 or the translator. After the planet gear 108 passes across the portion of ring gear 124, the swing body 114 limits its distance of traversal, and then the swing body 114 spins freely. These sequence of events, as mentioned above, occurs in the same way in both forward and reverse directions. However, only during rotation in the reverse direction that the rack or ring gear 124 portion is necessary to push through the resistance of the cams 140 that push the cam body 106 away from the output gear 116.

Figure 9:
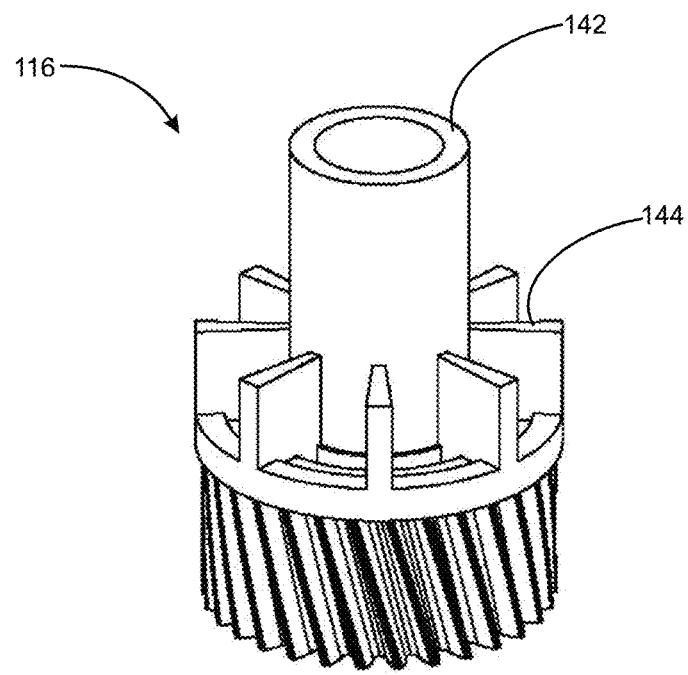
FIG. 9 is a top perspective view of the output gear of the partial reverse clutch assembly, according to the first embodiment.

FIG. 9 is a top perspective view of the output gear 116 of the partial reverse clutch assembly 100, according to the first embodiment. The output gear 116 has a shaft 142 that holds the input gear 104 at a correct distance away to avoid the need for a snap feature or fastener on the bottom side of the input gear 104. Since this shaft 142 of the output gear 116 reaches past the coupling member 112, the shaft 142 is also used to centrally locate the coupling member 112. A set of flanges 144 are radially positioned around a bottom section of the shaft 142 to receive torque transfer from the coupling member 112. In an embodiment, an increased number of flanges 144 in the construction of the output gear 116 reduces the amount of backlash during the engagement of the coupling member 112, which reduces lag during re-engagement of the coupling member 112 with the output gear 116 during the forward rotation direction.

Figure 10:
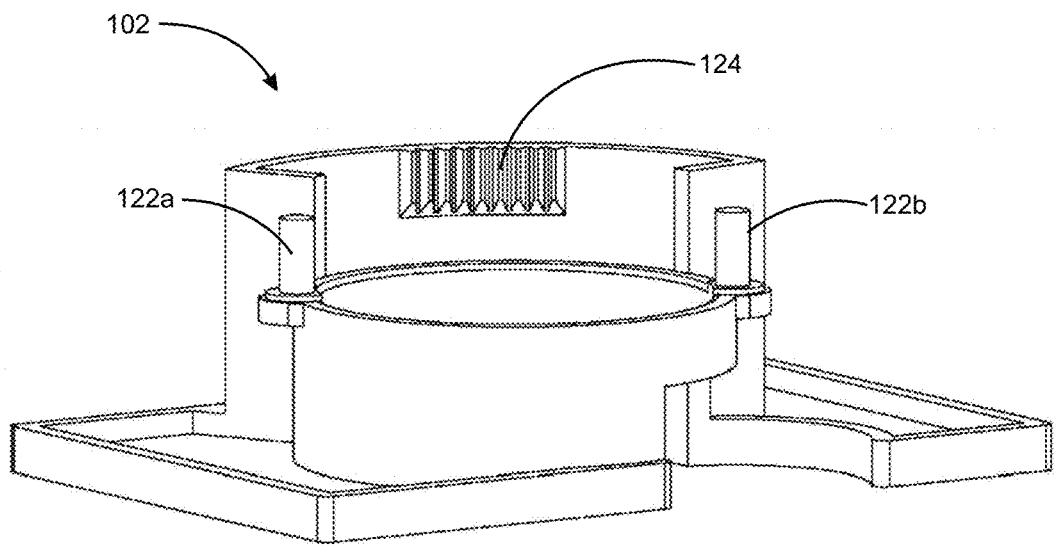
FIG. 10 is a bottom perspective view of the cam body or the translator of the partial reverse clutch assembly, according to the first embodiment.

FIG. 10 is a top perspective view of the frame 102 of the partial reverse clutch assembly 100, according to the first embodiment. As described before in FIG. 2, the frame 102 or the housing is configured to mount the input gear 104, the output gear 116, the coupling member 112, the cam body 106, and the swing body 114. The tall ring or the ring gear 124 portion on the frame 102 maintains the swing body 114 to be centrally positioned. The two posts or stopper portions 122a and 122b constrain motion of the cam body 106 or the translator. The walls at either end of the rack (or the ring gear 124 portion) limit the rotational motion of the rotator (or the swing body 114). The amount of reverse rotation transferred to the output gear 116 before disengagement is directly controlled by adjusting the length of the rack or the ring gear portion 124 and adjusting the spacing of the stopper portions 122a and 122b on either side of the ring gear portion 124.

Figure 11:
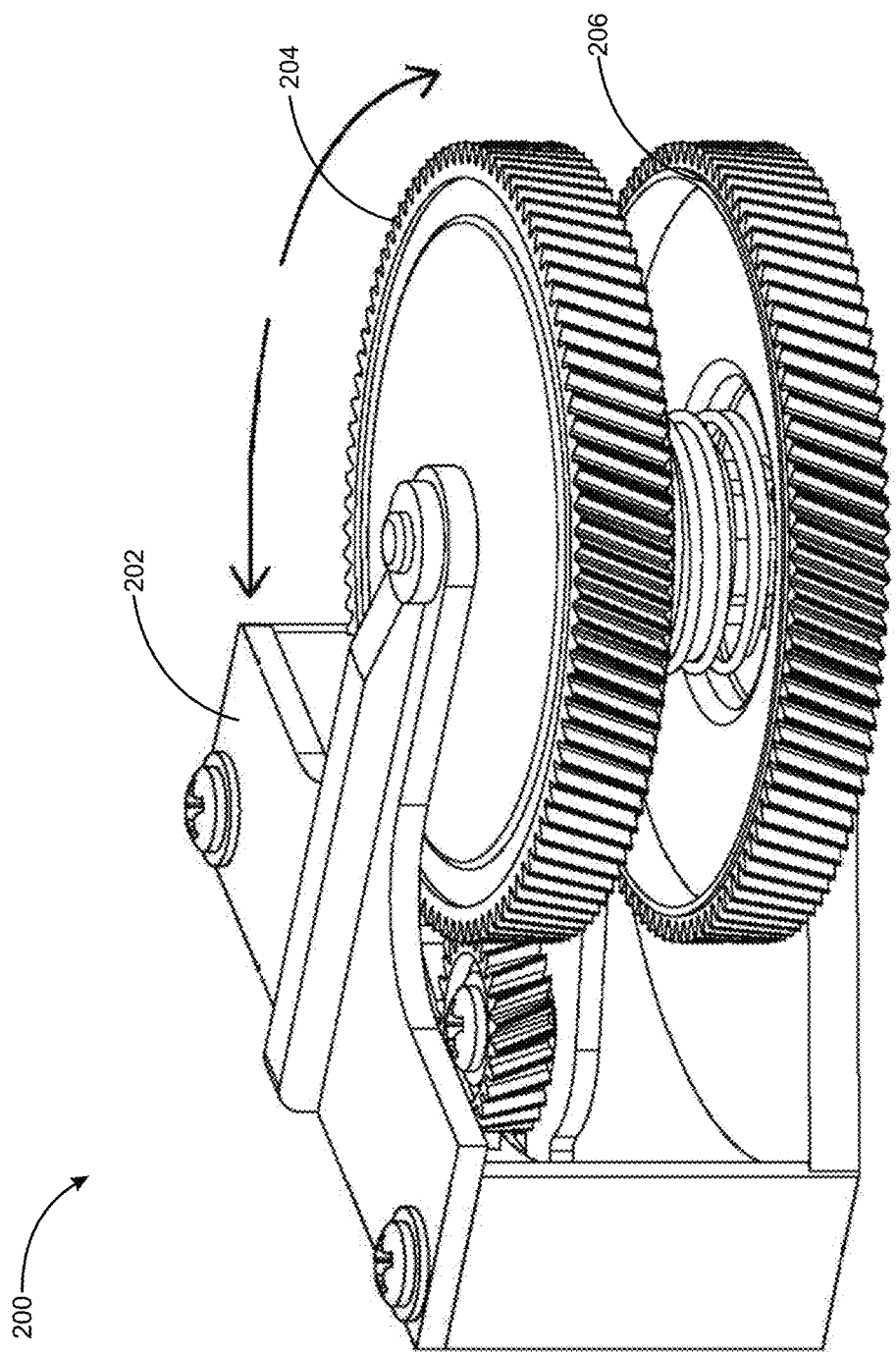
FIG. 11 is an isometric view of the partial reverse clutch assembly, as a second embodiment.

FIG. 11 is an isometric view of the partial reverse clutch assembly 200, as a second embodiment. The main components in this isometric view of the partial reverse clutch assembly 200 include the frame 202 or the housing, an input gear 204 housed in the frame 202, and an output gear 206 housed in the frame 202 and coupled to the input gear 204. The arrows show the corresponding direction of rotation of the input gear 204 and the output gear 206 based on the motorized rotational drive. Furthermore, the positioning and functionality of other associated components of the partial reverse clutch assembly 200 are clearly described in the exploded view shown in FIG. 12.

Figure 12:
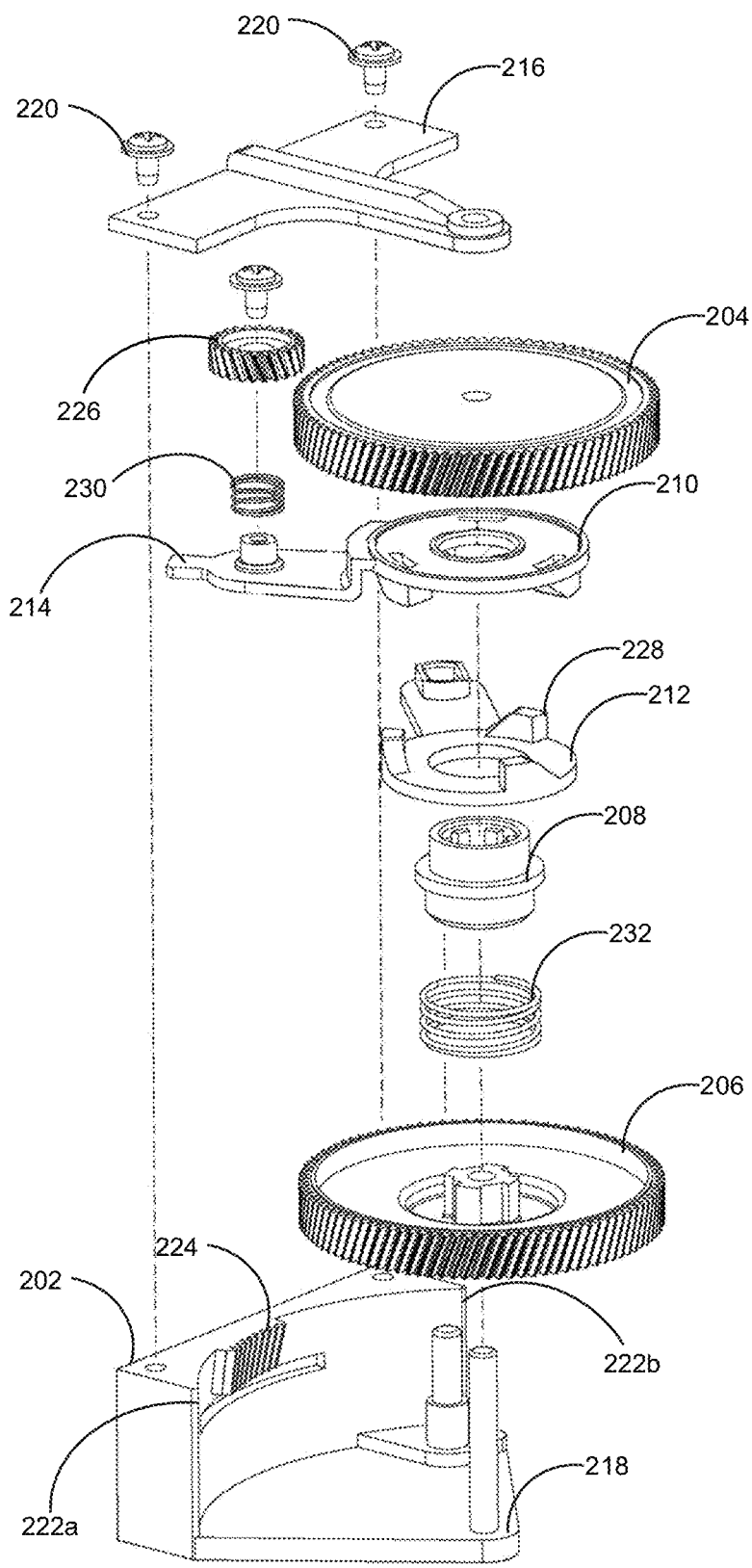
FIG. 12 is an exploded view of the partial reverse clutch assembly shown in FIG. 1, as the second embodiment.

FIG. 12 is an exploded view of the partial reverse clutch assembly 200 shown in FIG. 1, as the second embodiment. The partial reverse clutch assembly 200 includes the frame 202, a coupling member 208, a corrugated swing body 210, and a cam body 212. The frame 202 is designed to assemble the input gear 204 and the output gear 206, and the coupling member 208 or the coupler is disposed between the input gear 204 and the output gear 206. The coupling member 208 couples the input gear 204 to the output gear 206 to transmit a motorized rotational drive in a first direction. The swing body 210 is coupled between the input gear 204 and the coupling member 208, and comprises a projecting swing arm 214. The cam body 212 is configured to abut and define a sliding contact between the swing body 210 and the coupling member 208, so that a reversal of the motorized rotational drive oppositely rotates the output gear 206 in engagement with the swing arm 214 in a second direction, or a reverse direction. The cam body 212 is displaced, or lowered, upon contact with the swing body 210 during the rotation in the second direction to decouple the coupling member 208 between the input gear 204 and the output gear 206.

In some embodiments, the frame 202 mounts the input gear 204 on a upper arm 216 and mounts the output gear 206 on an lower arm 218, where the input gear 204 and the output gear 206 are axially aligned to each other. The lower arm 218 is an extension of the frame while the upper arm 216 is attached via fasteners 220. In some embodiments, the coupling member 208 is cylindrical in form and is axially aligned with respect to the input gear 204 and the output gear 206. The coupling member 208 is assembled linearly in line with the input gear 204 and the output gear 206. In an embodiment, an intermediate spring 232 is positioned between the input gear 204 and the coupling member 208, so that the input gear 204 is spring loaded to push the input gear 204 upward during the rotation in the second or reverse direction.

In some embodiments, the output gear 206 in engagement with the swing arm 214 rotates in the second direction or the reverse direction at a predetermined angle of rotation that is based on at least two stopper portions 222a and 222b positioned on the frame 202 that intercept the reverse rotation of the swing arm 214. The stopper portions 222a and 222b restrain the reverse rotation of the swing arm 214 after the predetermined angle of rotation. In some embodiments, the partial reverse clutch assembly 200 further comprises a ring gear 224 and a planet gear 226, wherein the ring gear 224 is positioned on the frame 202 and the planet gear 226 is distally positioned on the swing arm 214. The engagement between the ring gear 224 and the planet gear 226 generates a force on the swing arm 214 to push the swing body 210 against the cam body 212 to displace or lower the cam body 212 during the reverse rotation.

In some embodiments, a variation in the gear ratios between the ring gear 224 and the planet gear 226 determines the angle of reverse rotation of the output gear 206 before the decoupling of the coupling member 208 between the input gear 204 and the output gear 206. A variation in an inclination of cam portions 228 on the cam body 212 determines the angle of reverse rotation of the output gear 206 before the decoupling of the coupling member 208 between the input gear 204 and the output gear 206. In some embodiments, a variation in the positioning of the two stopper portions 222a and 222b determine the angle of reverse rotation of the output gear 206 before the decoupling of the coupling member 208 between the input gear 204 and the output gear 206. In another embodiment, a friction spring 230 is positioned between the swing arm 214 and the planet gear 226 to further lower the cam body 212 when the swing arm 214 pushes the swing body 210 against the cam body 212.

In some embodiments, the decoupling of the coupling member 208 between the input gear 204 and the output gear 206 freely rotates the input gear 204 until the motorized rotational drive is reinstated in the first direction of rotation. As a result, the reversal of the motorized rotational drive is configured to reverse a printing path of a printable media that is driven by the motorized rotational drive for a duplex operation of a printer. In some embodiments, the reversal of the motorized rotational drive simultaneously partially rotates a photoconductor drum gear that is in geared engagement with the output gear 206 due to partial rotation of the output gear 206 in the second direction.

FIGS. 13A-13D show a top perspective view, a bottom perspective view, a top view, and a sectional view respectively of the partial reverse clutch assembly 200, when the coupling member 208 is engaged, according to the second embodiment. As described before, the frame 202 is designed to mount the input gear 204 and the output gear 206, where the coupling member 208 is disposed between the input gear 204 and the output gear 206. A motorized rotational drive is provided in a first direction, or the forward direction, to the input gear 204 of the partial reverse clutch assembly 200, which is transmitted from the input gear 204 to the output gear 206 via the coupling member 208.

Figure 13A:
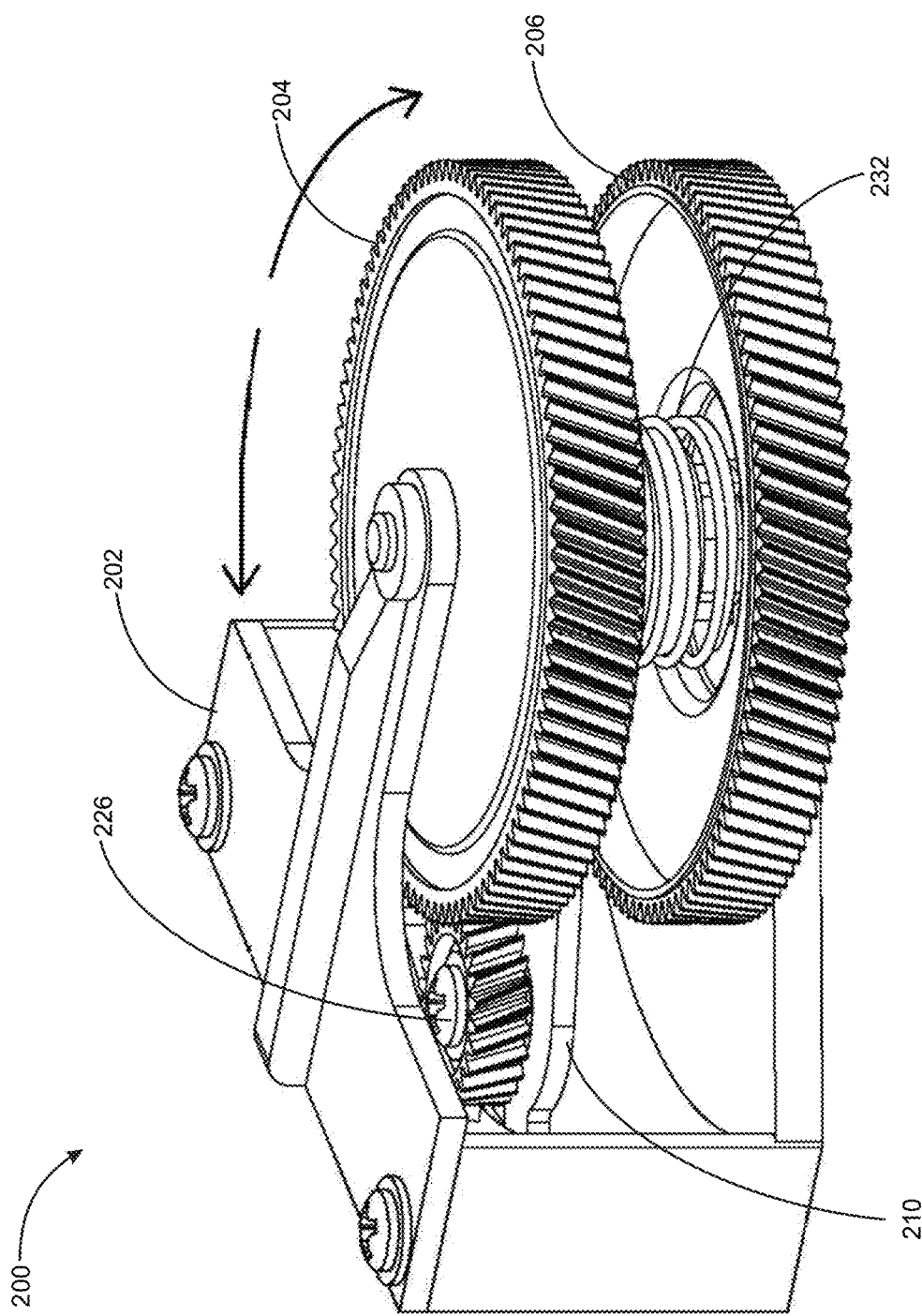
FIG. 13A is a top perspective view of the partial reverse clutch assembly when the coupling member is engaged, according to the second embodiment.
Figure 13B:
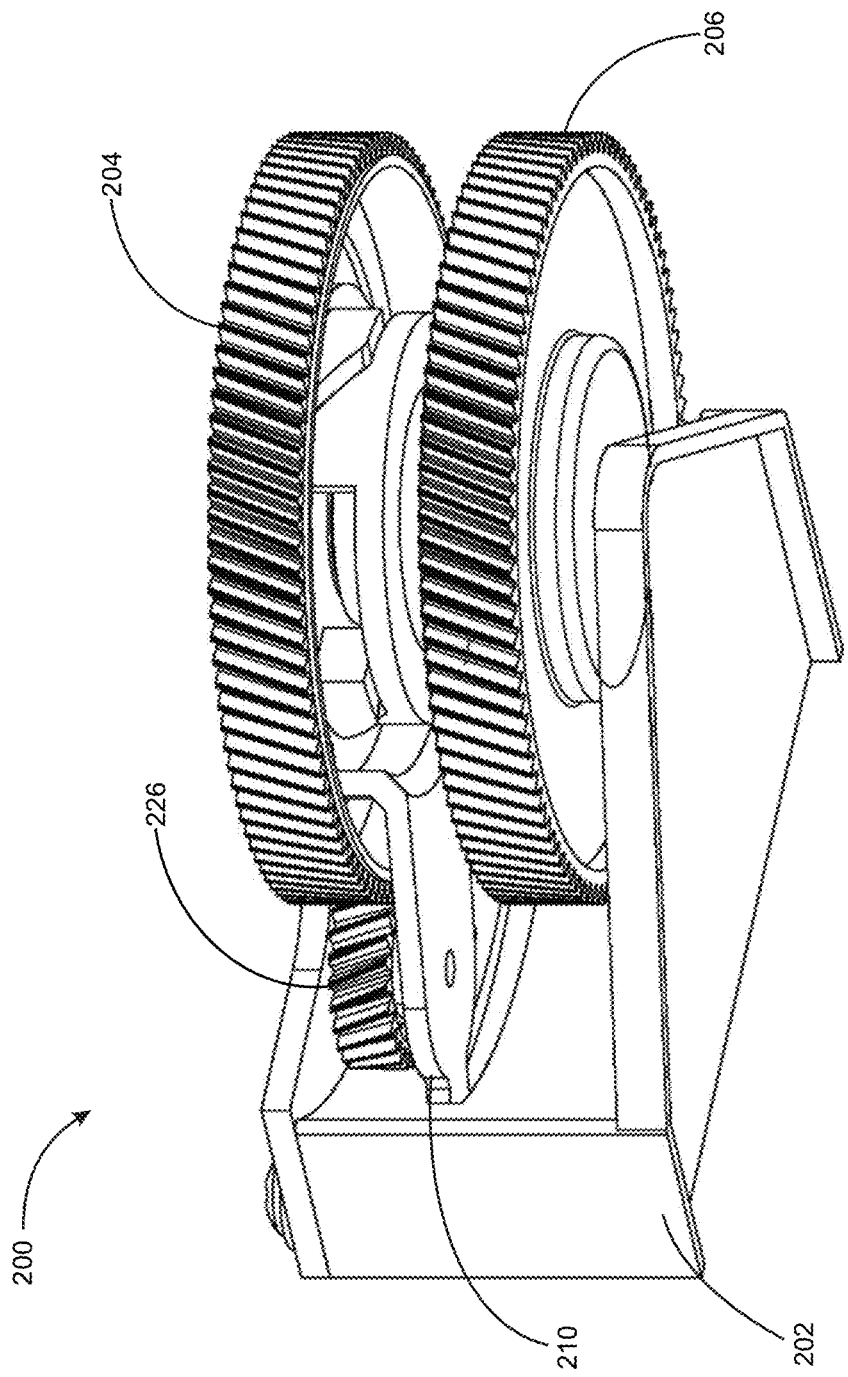
FIG. 13B is a bottom perspective view of the partial reverse clutch assembly when the coupling member is engaged, according to the second embodiment.
Figure 13C:
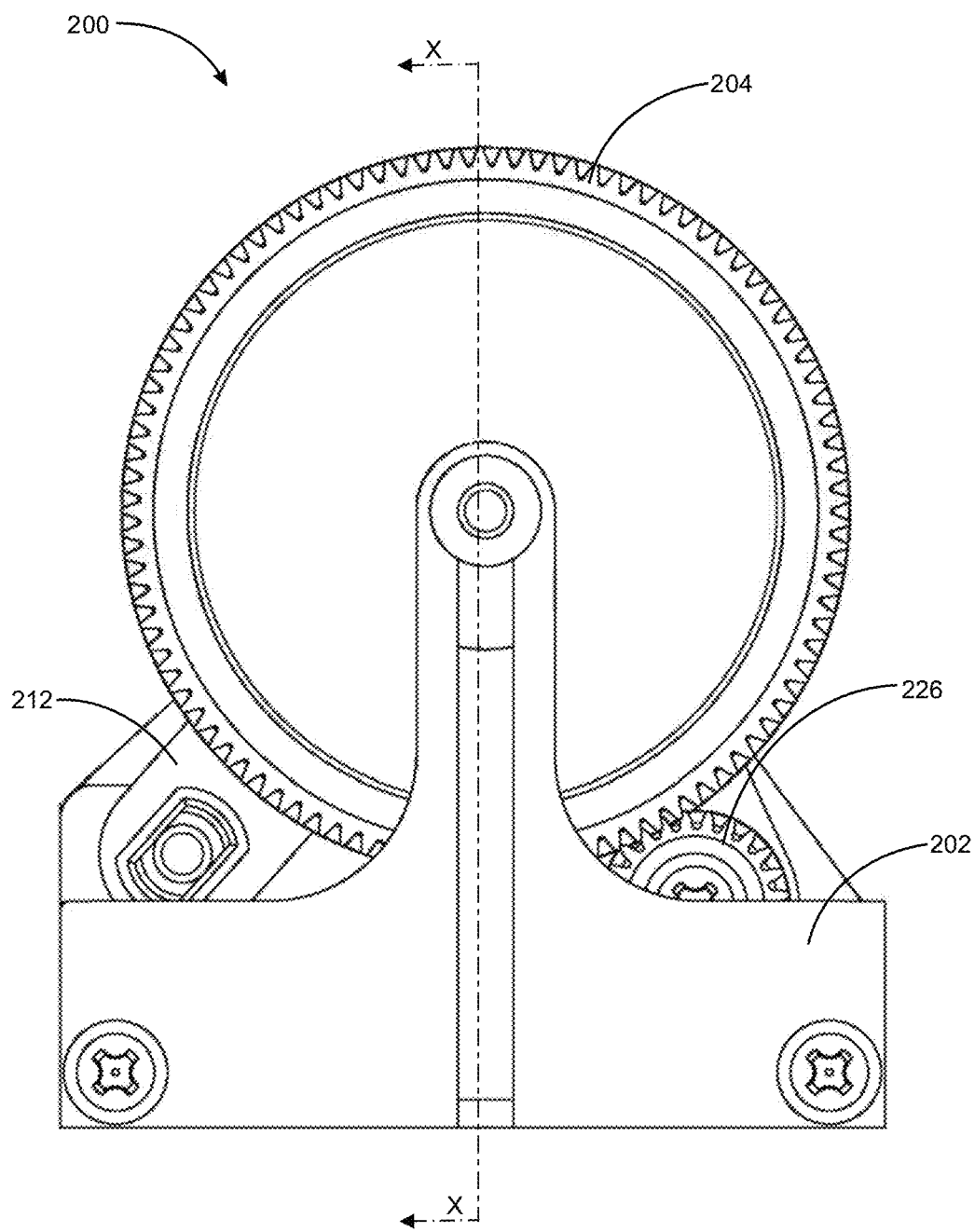
FIG. 13C is a top view of the partial reverse clutch assembly, when the coupling member is engaged, according to the second embodiment.
Figure 13D:
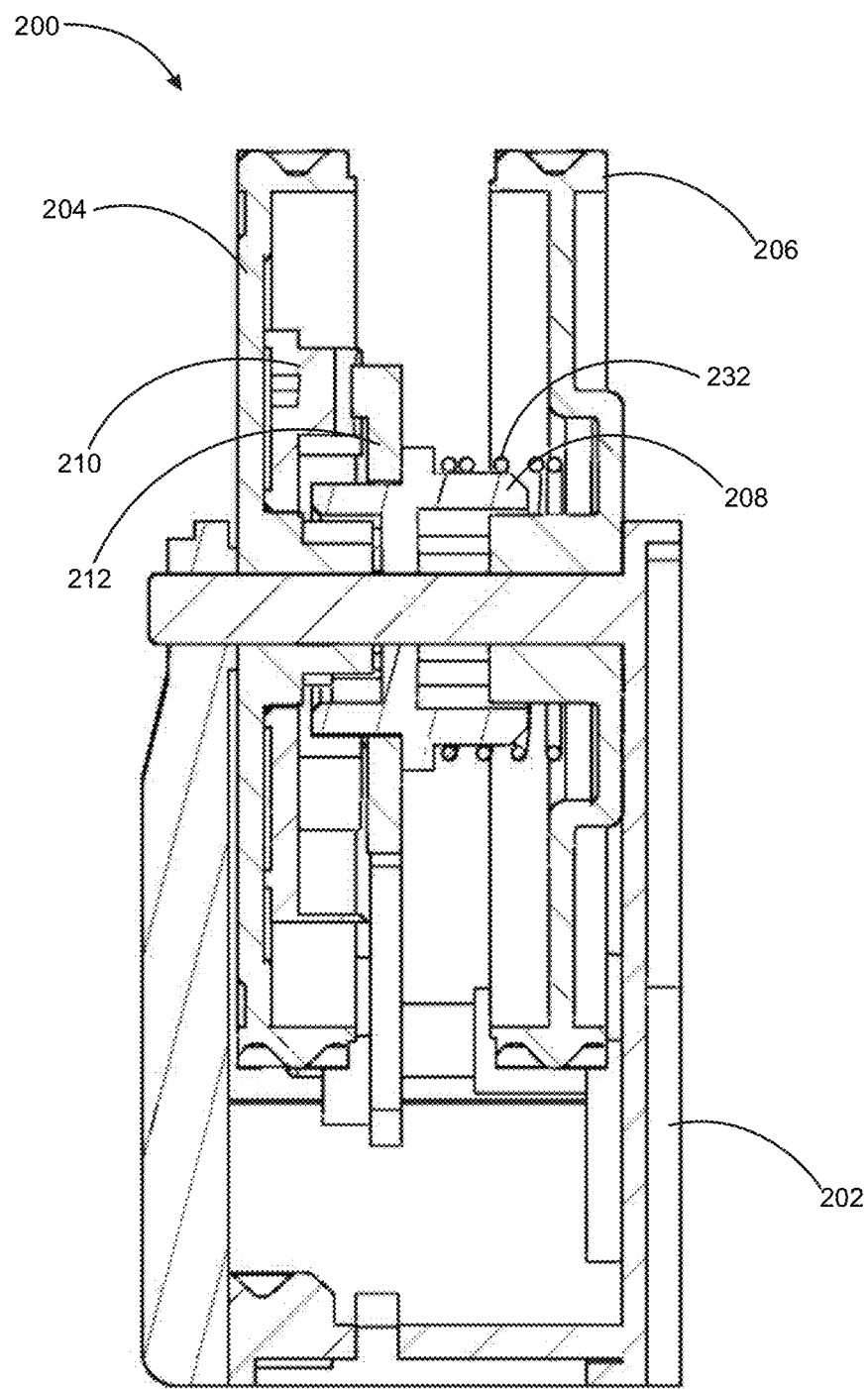
FIG. 13D is a sectional view of the partial reverse clutch assembly along the section X-X shown in FIG. 13C, when the coupling member is engaged, according to the second embodiment.

The intermediate spring 232 between the coupling member 208 and the input gear 204 provides spring loading to the input gear 204 to push the coupling member 208 and the output gear 206 during the reverse rotation. During the forward rotation of the input gear 204 from the motorized rotational drive, the coupling member 208 engages the input gear 204 and the output gear 206 continually, so that the output gear 206 is continuously rotated throughout the forward rotation of the input gear 204. The planet gear 226, as shown in FIG. 13A, rotates from one end of the engagement portion of the ring gear 224 and rests at the other end of the engagement portion, to allow the continuous engagement of the input gear 204 and the output gear 206.

Figure 14A:
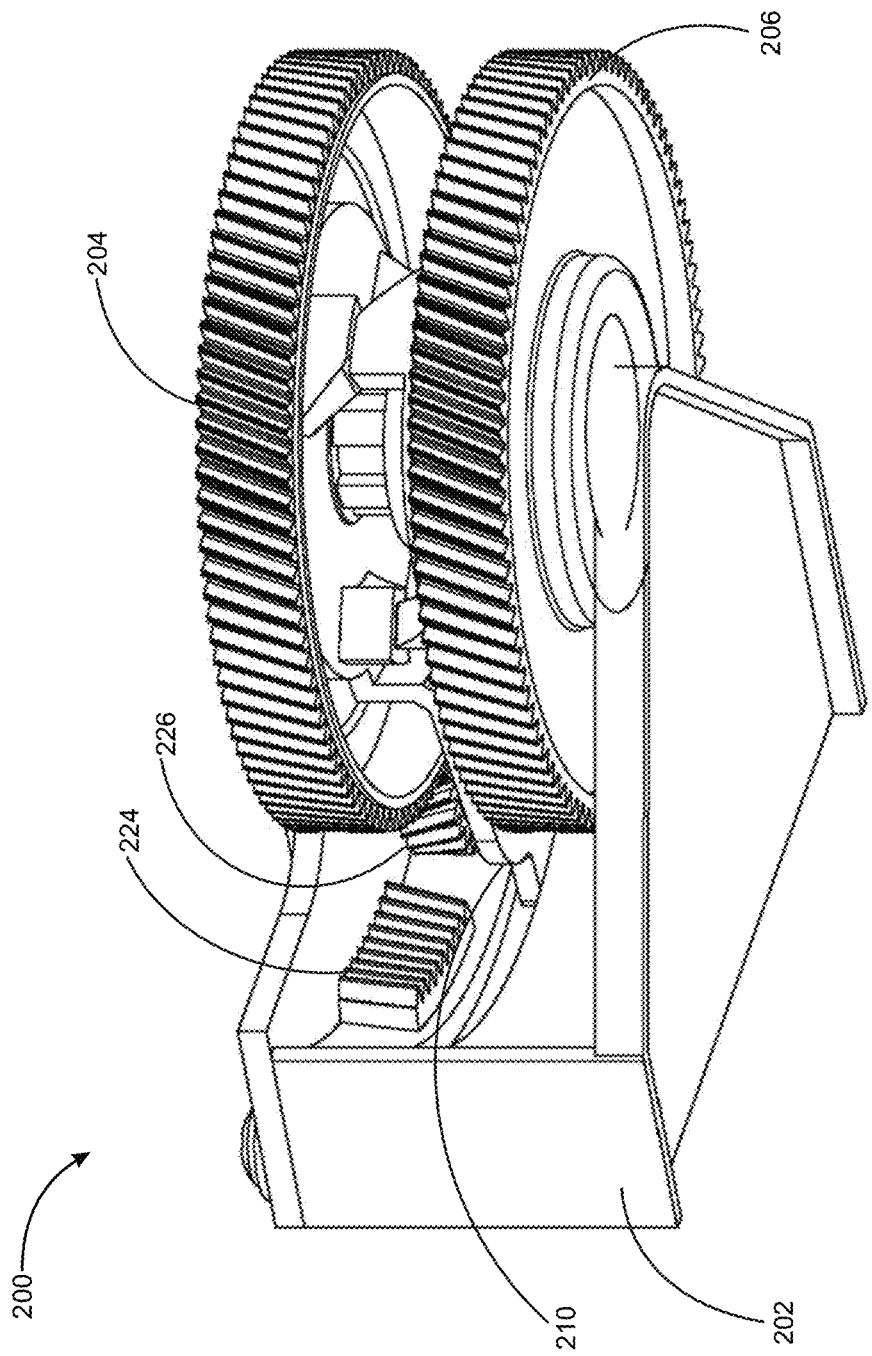
FIG. 14A is a bottom perspective view of the partial reverse clutch assembly when the coupling member is disengaged, according to the second embodiment.
Figure 14B:
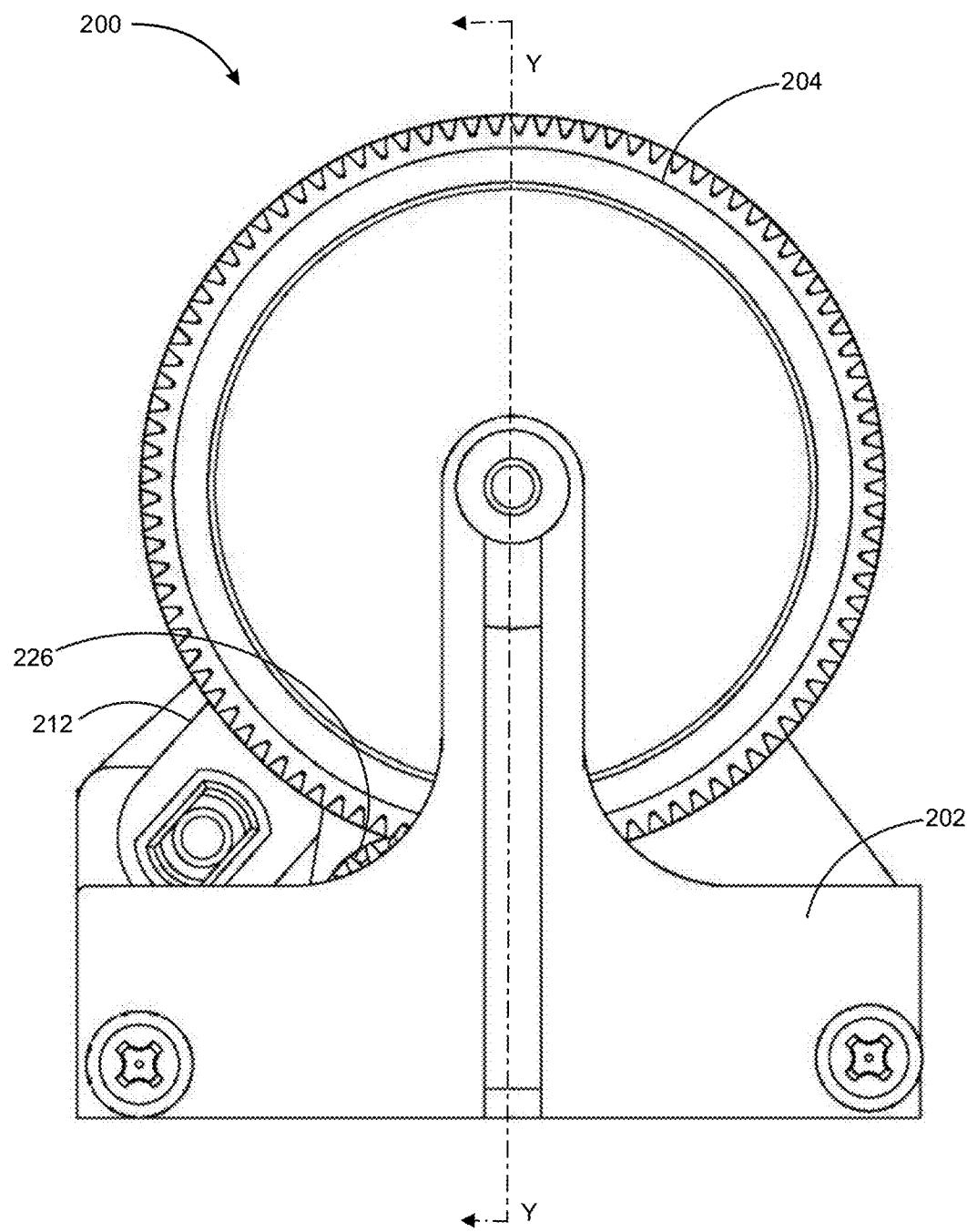
FIG. 14B is a top view of the partial reverse clutch assembly, when the coupling member is disengaged, according to the second embodiment.
Figure 14C:
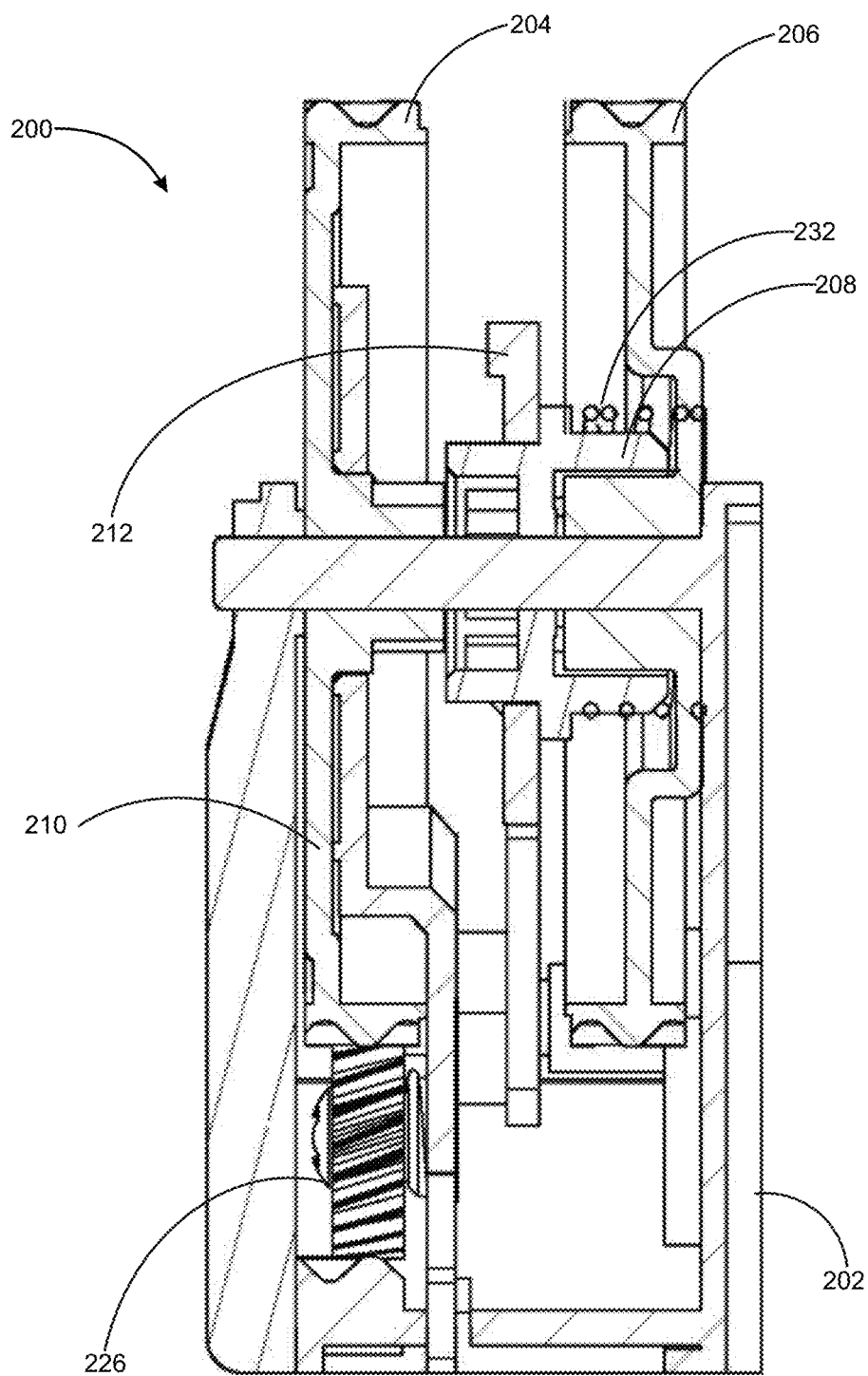
FIG. 14C is a sectional view of the partial reverse clutch assembly along the section Y-Y shown in FIG. 14B, when the coupling member is disengaged, according to the second embodiment.

FIGS. 14A-14C is a bottom perspective view, a top view, and a sectional view respectively of the partial reverse clutch assembly 200, when the coupling member 208 is disengaged, according to the second embodiment. The swing body 210 is operatively positioned between the input gear 204 and the coupling member 208, and comprises a projecting swing arm 214, as shown in FIG. 12. The cam body 212 defines a sliding contact between the swing body 210 and the coupling member 208. When the motorized drive is reversed, the output gear 206 is rotated in an opposite direction in engagement with the swing arm 214 in the reverse direction with respect to the forward direction shown in FIG. 13A. During the rotation in the reverse direction, the cam body 212 is displaced or lowered when in contact with the swing body 210 to separate the coupling member 208 from between the input gear 204 and the output gear 206.

Figure 15:
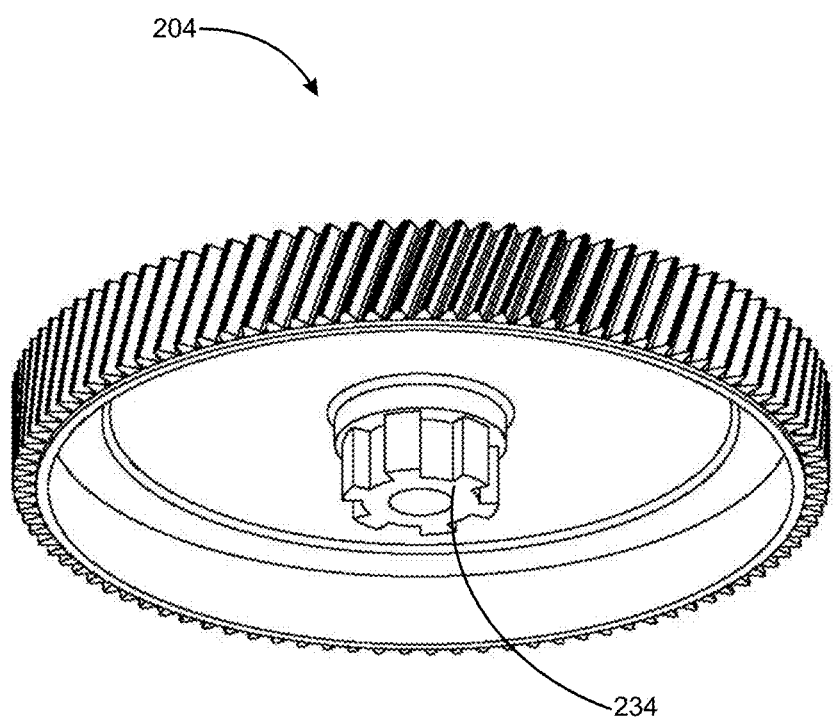
FIG. 15 is a bottom perspective view of the input gear of the partial reverse clutch assembly, according to the second embodiment.

FIG. 15 is a bottom perspective view of the input gear 204 of the partial reverse clutch assembly 200, according to the second embodiment. As described in FIG. 12, the coupling member 208 couples the input gear 204 to the output gear 206 to transmit a motorized rotational drive in the first direction. The spline 234 positioned at the bottom of the input gear 204 transfer torque to the coupling member 208 when the input gear 204 is engaged with the coupling member 208.

FIGS. 16A-16B show a top perspective view and a bottom perspective view respectively, of the corrugated swing body 210 of the partial reverse clutch assembly 200, according to the second embodiment. The swing arm 214 extends from the central portion of the swing body 210. The swing body 210 that includes the swing arm 214 has a narrow range of motion that determines how far the system comprising the input gear 204, output gear 206 and the coupling member 208 rotates in reverse before disengaging the output gear 206. This rotation is facilitated by the movement of the planet gear 226. When the input gear 204 switches directions between forward and reverse direction, the planet gear 226 is pulled with the input gear 204 due to its resistance to spinning from the friction spring 230. This pulls the planet gear 226 into the ring gear 224 or the rack positioned on the frame 202, which subsequently forces the planet gear 226 to continue rotating with the input gear 204, even when the planet gear 226 encounters resistance from the cams 236 of the swing body 210 that push the cam body 212.

After the planet gear 226 passes across of the ring gear 224, the swing body 210 limits how much farther the planet gear 226 traverses, and then the planet gear 226 freely spins. These sequences of events occur in the same way in both forward and reverse directions, but it is only in the reverse direction that the ring gear 224 is necessary to push through the resistance of the cams 236 that push the cam body 212 away from the input gear 204. The cams 236 at the bottom of the swing body 210 push the cam body 212 down as the planet gear 226 moves through the ring gear 224 in the reverse direction.

Figure 16:
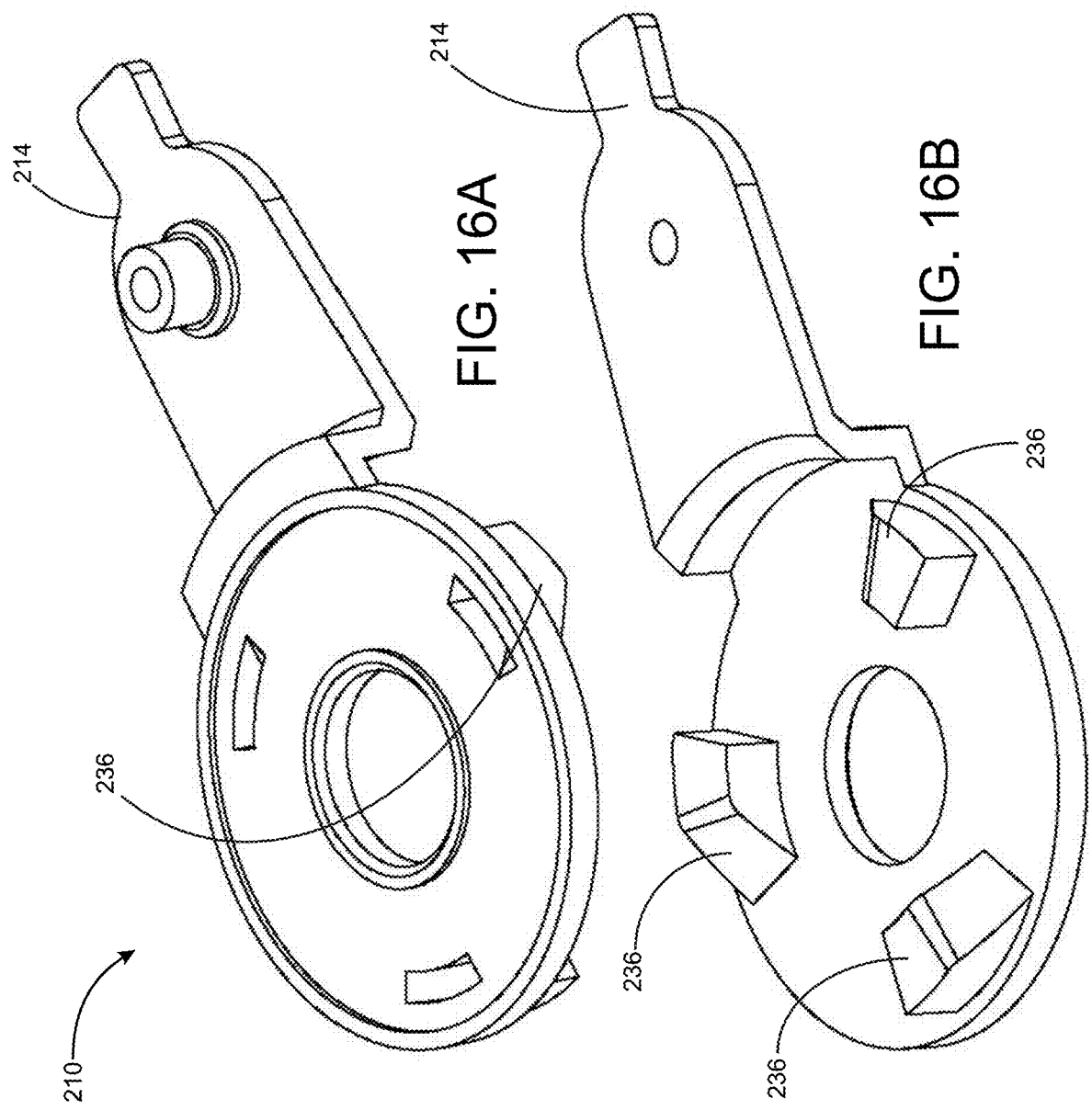
FIG. 16A is a top perspective view of the corrugated swing body of the partial reverse clutch assembly, according to the second embodiment.
FIG. 16B is a bottom perspective view of the corrugated swing body of the partial reverse clutch assembly, according to the second embodiment.
Figure 17:
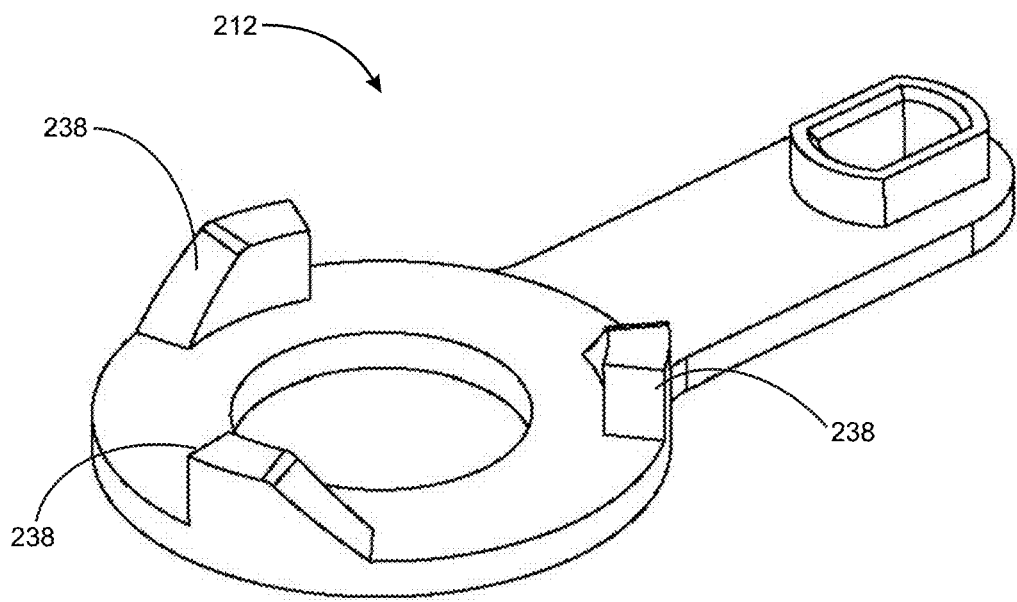
FIG. 17 is a top perspective view of the cam body of the partial reverse clutch assembly, according to the second embodiment.

FIG. 17 is a top perspective view of the cam body 212 of the partial reverse clutch assembly 100, according to the second embodiment. The cam body 212 is positioned, or in other words, trapped between the coupling member 208 and the swing body 210. The cam body 212 is rotationally locked by a pin on the frame 202 or the housing, so the cams 236 on the swing body 210, as shown in FIG. 16, pushes the cam body 212 down or allow it to travel up. The cam body 212 includes a set of cams 238 that are configured to interact with the cams 236 of the swing body 210 to push the swing body 210 in an upward direction during the reverse rotation. The coupling member 208 always has an upward thrust, so the coupling member 208 always follows the vertical motion of the cam body 212.

Figure 18:
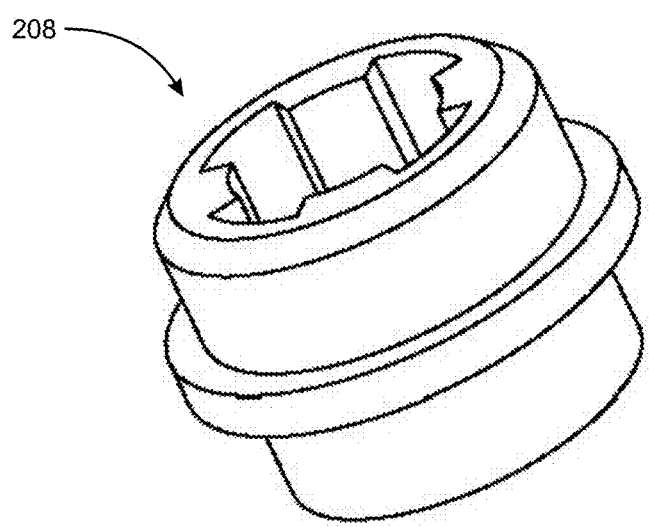
FIG. 18 is a top perspective view of the coupling member of the partial reverse clutch assembly, according to the second embodiment.

FIG. 18 is a top perspective view of the coupling member 208 of the partial reverse clutch assembly 200, according to the second embodiment. The coupling member 208 is always in engagement with the output gear 206. The coupling member 208 is spring loaded using the intermediate spring 232, as shown in FIG. 12, toward the input gear 204, and its vertical position is limited by the cam body 212. When the cam body 212 moves upward in the forward direction, the coupling member 208 follows the cam body 212 and engages with the input gear 204. During reverse rotation, the cam body 212 is pushed down to disengage the coupling member 208 between the input gear 204 and the output gear 206.

Figure 19:
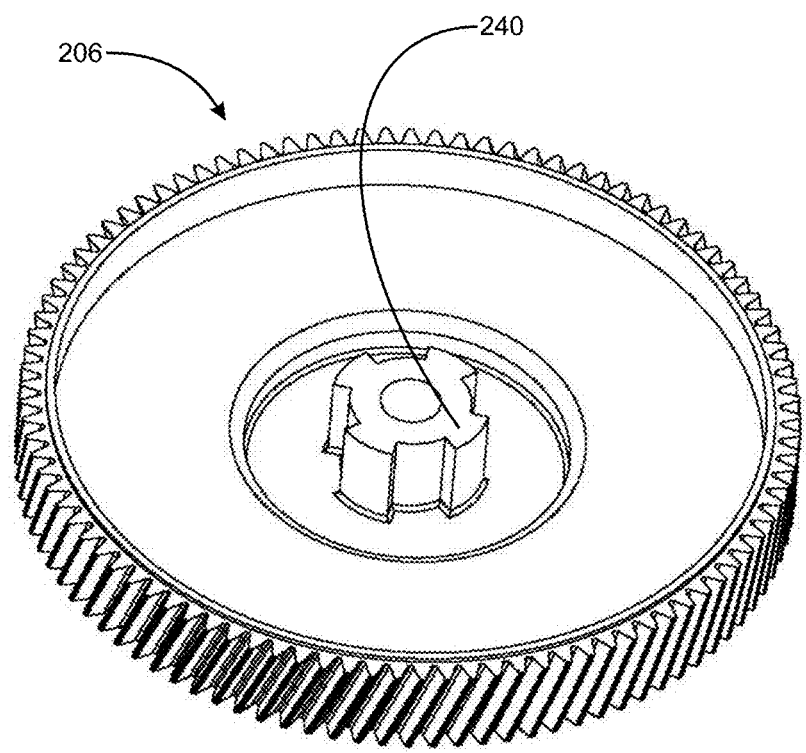
FIG. 19 is a top perspective view of the output gear of the partial reverse clutch assembly, according to the second embodiment.

FIG. 19 is a top perspective view of the output gear 206 of the partial reverse clutch assembly 200, according to the second embodiment. The output gear 206 is coupled with the input gear 204 via the coupling member 208 to transmit a motorized rotational drive in the first direction. As shown in FIG. 12, the swing body 210 is coupled between the input gear 204 and the coupling member 208 and the cam body 212 defines a sliding contact between the swing body 210 and the coupling member 208, so that a reversal of the motorized rotational drive oppositely rotates the output gear 206 in engagement with the swing arm 214 in the second direction, or a reverse direction. A spline 240 is positioned on the output gear 206, which is always in contact with the coupling member 208. Therefore, the spline 240 receives torque from the coupling member 208 when the coupling member 208 is engaged with the input gear 204.

Figure 20:
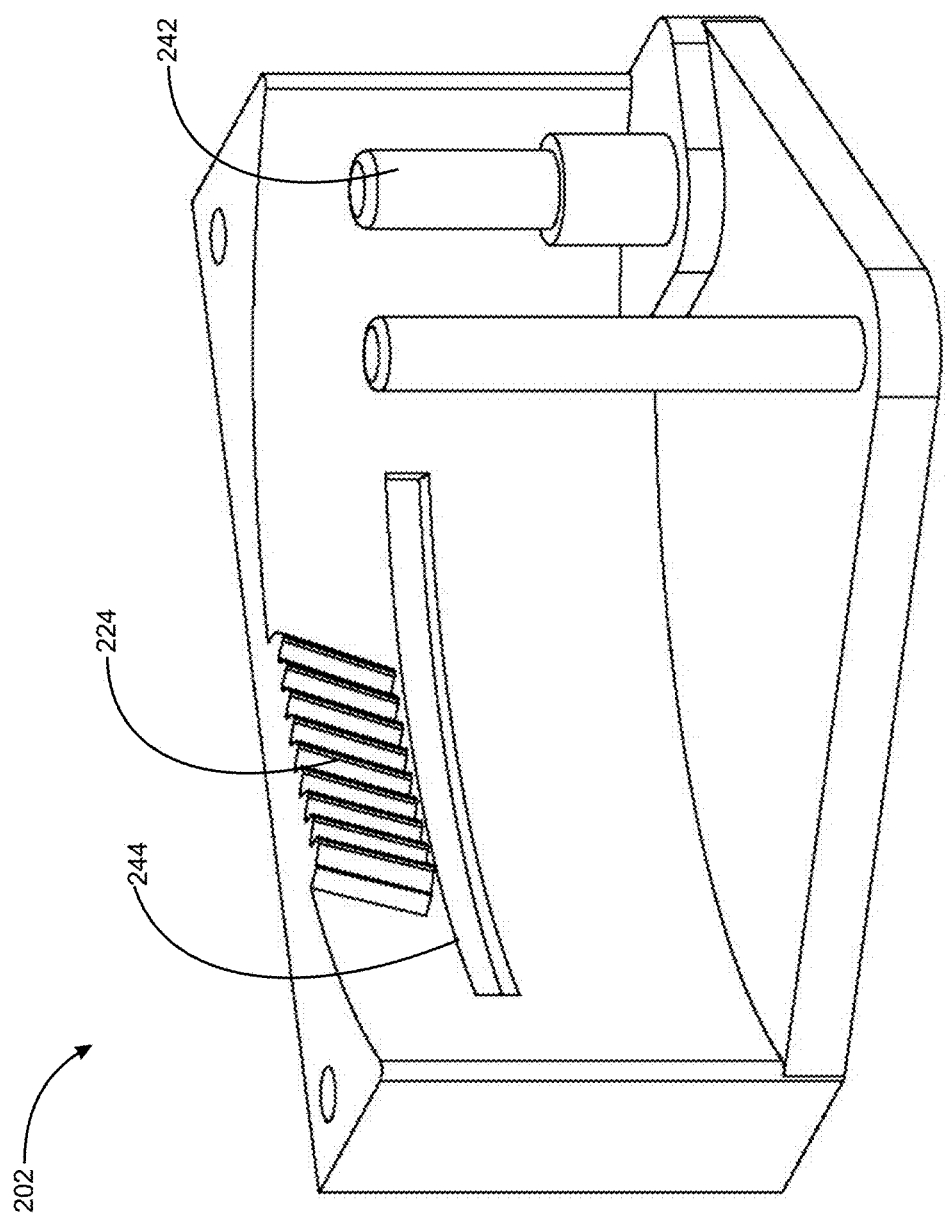
FIG. 20 is a top perspective view of the frame of the partial reverse clutch assembly, according to the second embodiment.

FIG. 20 is a top perspective view of the frame 202 of the partial reverse clutch assembly 200, according to the second embodiment. A shorter post 242 of the frame 202 prevents rotation of the cam body 212. A slot 244 positioned under the ring gear 224 or the rack limits the rotational motion of the swing body 210. The amount of reverse rotation transferred to the output gear 206 before disengagement is directly controlled by adjusting the length of the ring gear 224 and the slot 244 positioned below the ring gear 224.

Based on the first and second embodiment of the partial reverse clutch assembly 100 and 200, in the forward or first direction the input and output gears are driven normal manner. However, once the input gear rotation is reversed the output gear will drive for a predetermined amount of rotation. In example partial reverse clutch assemblies 100 and 200 are adjusted between 10 to 180 degrees of output fairly easily. Once the desired amount of reversing motion is achieved the output gear is decoupled which allows the input gear to freely spin and the output gear is maintained idle until the forward direction is engaged once again.

The foregoing description of several methods and an embodiment of the present disclosure have been presented for purposes of illustration. It is not intended to be exhaustive or to limit the present disclosure to the precise steps and/or forms disclosed, and obviously many modifications and variations are possible in light of the above description. It is intended that the scope of the present disclosure be defined by the claims appended hereto.

We claim:

1. A partial reverse clutch assembly, comprising:
a frame configured to mount an input gear and an output gear;
a coupling member disposed between the input gear and the output gear, wherein the coupling member couples the input gear to the output gear to transmit a motorized rotational drive in a first direction;
a corrugated swing body coupled between the input gear and the coupling member, and comprises a projecting swing arm; and
a cam body that abuts and defines a sliding contact between the corrugated swing body and the coupling member, wherein a reversal of the motorized rotational drive oppositely rotates the output gear in engagement with the swing arm in a second direction, and wherein the cam body is displaced upon contact with the corrugated swing body during the rotation in the second direction to decouple the coupling member between the input gear and the output gear.

2. The partial reverse clutch assembly of claim 1, wherein the frame mounts the input gear on a lower arm and mounts the output gear on an upper arm, and wherein the input gear and the output gear are axially aligned to each other.

3. The partial reverse clutch assembly of claim 1, wherein the coupling member is cylindrical in form and axially aligned with respect to the input gear and the output gear.

4. The partial reverse clutch assembly of claim 1, wherein the output gear in engagement with the swing arm rotates in the second direction at a predetermined angle of rotation that is based on at least two stopper portions positioned on the frame that intercept the reverse rotation of the swing arm.

5. The partial reverse clutch assembly of claim 4, wherein a variation in the positioning of the at least two stopper portions determine the angle of reverse rotation of the output gear before the decoupling of the coupling member between the input gear and the output gear.

6. The partial reverse clutch assembly of claim 1, further comprises a ring gear and a planet gear, wherein the ring gear is positioned on the frame and the planet gear is distally positioned on the swing arm, and wherein the engagement between the ring gear and the planet gear generates a force on the swing arm to push the corrugated swing body against the cam body to push the cam body.

7. The partial reverse clutch assembly of claim 6, wherein a variation in the gear ratios between the ring gear and the planet gear determines the angle of reverse rotation of the output gear before the decoupling of the coupling member between the input gear and the output gear.

8. The partial reverse clutch assembly of claim 1, wherein a variation in an inclination of cam portions on the cam body determines the angle of reverse rotation of the output gear before the decoupling of the coupling member between the input gear and the output gear.

9. The partial reverse clutch assembly of claim 1, wherein the decoupling of the coupling member between the input gear and the output gear freely rotates the input gear until the motorized rotational drive is reinstated in the first direction of rotation.

10. The partial reverse clutch assembly of claim 1, wherein the reversal of the motorized rotational drive is configured to reverse a printing path of a printable media that is driven by the motorized rotational drive for a duplex operation of a printer.

11. The partial reverse clutch assembly of claim 10, wherein the reversal of the motorized rotational drive simultaneously partially rotates a photoconductor drum gear that is in geared engagement with the output gear due to partial rotation of the output gear in the second direction.

12. A method for partially rotating an output gear in a reverse direction and decoupling the output gear from an input gear after the partial rotation of the output gear, the method comprising:
providing partial reverse clutch assembly comprising:
a frame configured to mount the input gear and the output gear;
a coupling member disposed between the input gear and the output gear;
a corrugated swing body coupled between the input gear and the coupling member, and comprises a projecting swing arm; and
a cam body that abuts and defines a sliding contact between the swing body and the coupling member;
transmitting a motorized rotational drive to rotate the input gear and the output gear being coupled via the coupling member in a first direction;
oppositely rotating the output gear in engagement with the swing arm in a second direction upon a reversal of the motorized rotational drive;
displacing the cam body in response to a contact with the corrugated swing body during the rotation in the second direction; and
decoupling the output gear from the input gear via disengagement of the coupling member, in response to the displacement of the cam body.

13. The method of claim 12, wherein the frame mounts the input gear on a lower arm and mounts the output gear on an upper arm, and wherein the input gear and the output gear are axially aligned to each other.

14. The method of claim 12, wherein the coupling member is cylindrical in form and axially aligned with respect to the input gear and the output gear.

15. The method of claim 12, further comprising:
generating a force on the swing arm via engagement of a ring gear positioned on the frame and a planet gear distally positioned on the swing arm;
pushing the corrugated swing body against the cam body using the generated force; and
displacing the cam body due to the push from the corrugated swing body.

16. The method of claim 15, further comprising varying the gear ratios between the ring gear and the planet gear to determine the angle of reverse rotation of the output gear before the decoupling of the coupling member between the input gear and the output gear.

17. The method of claim 12, further comprising varying an inclination of cam portions on the cam body determines the angle of reverse rotation of the output gear before the decoupling of the coupling member between the input gear and the output gear.

18. The method of claim 12, wherein the output gear in engagement with the swing arm rotates in the second direction at a predetermined angle of rotation that is based on at least two stopper portions positioned on the frame that intercept the reverse rotation of the swing arm.

19. The method of claim 18, further comprising varying the positioning of the stopper portions determines the angle of reverse movement of the output gear before the decoupling of the coupling member between the input gear and the output gear.

20. The method of claim 12, further comprising freely rotating the input gear after the decoupling of the coupling member between the input gear and the output gear until the motorized rotational drive is reinstated in the first direction of rotation.

21. The method of claim 12, further comprising reversing a printing path of a printable media that is driven by the motorized rotational drive for a duplex operation of a printer due to the reversal of the motorized rotational drive.

22. The method of claim 21, further comprising simultaneously partially rotating a photoconductor drum gear that is in engagement with the output gear due to partial rotation of the output gear via the reversal of the motorized rotational drive along the predetermined angle in the second direction.

* * * * *